US011709741B1

(12) United States Patent
Uppal et al.

(10) Patent No.: US 11,709,741 B1
(45) Date of Patent: Jul. 25, 2023

(54) SYSTEMS AND METHODS FOR ENABLING A FAILOVER SERVICE FOR BLOCK-STORAGE VOLUMES

(71) Applicant: Amazon Technologies, Inc., Seattle, WA (US)

(72) Inventors: Hardeep Singh Uppal, Seattle, WA (US); Harvo Reyzell Jones, Gig Harbo, WA (US); Brad E Marshall, Bainbridge Island, WA (US); Joseph Elmar Magerramov, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/216,301

(22) Filed: Mar. 29, 2021

(51) Int. Cl.
*G06F 11/00* (2006.01)
*G06F 11/20* (2006.01)
*H04L 12/46* (2006.01)
*G06F 11/07* (2006.01)
*H04L 45/28* (2022.01)

(52) U.S. Cl.
CPC ...... *G06F 11/2023* (2013.01); *G06F 11/0709* (2013.01); *H04L 12/4641* (2013.01); *G06F 2201/85* (2013.01); *H04L 45/28* (2013.01)

(58) Field of Classification Search
CPC . H04L 63/0272; H04L 45/22; H04L 41/0663; G06F 11/0709; G06F 11/2023
See application file for complete search history.

(56) References Cited

U.S. PATENT DOCUMENTS 6,865,591 B1   3/2005   Garg
8,595,547 B1   11/2013  Sivasubramanian
(Continued)

FOREIGN PATENT DOCUMENTS

CN    105144138    12/2015
CN    110297801    10/2019
(Continued)

OTHER PUBLICATIONS

Search Report and Written Opinion dated Jul. 16, 2021, issued in PCT/US2021/024173.
(Continued)

*Primary Examiner* — Michael Maskulinski
(74) *Attorney, Agent, or Firm* — Knobbe, Martens, Olson & Bear LLP

(57) ABSTRACT

The present disclosure generally relates to a first network device in a primary region that can failover network traffic into a second network device in a failover region. The first network device can receive routing criteria identifying how traffic originating in the primary region should be routed. The first network device can transmit this routing criteria to the second network device in the failover region. Based on determining the occurrence of a failover event, the first network device may transmit network traffic originating in the primary region to the second network device in the failover region. The second network device can determine how to route the network traffic based on the routing criteria of the primary region. In some embodiments, the second network device can determine how to route the network traffic based on the routing criteria of the failover region.

27 Claims, 14 Drawing Sheets

(56) References Cited

U.S. PATENT DOCUMENTS

| | | |
|---|---|---|
| 8,918,673 B1 | 12/2014 | Rangaiah et al. |
| 9,116,862 B1 | 8/2015 | Rath |
| 9,274,903 B1 | 3/2016 | Garlapati |
| 9,984,140 B1 | 5/2018 | Sukumaran |
| 10,404,613 B1 | 9/2019 | Brooker |
| 10,713,129 B1 | 7/2020 | Turmala |
| 11,341,005 B2 | 5/2022 | Waters |
| 11,366,728 B2 | 6/2022 | MacCarthaigh |
| 11,385,975 B2 | 7/2022 | Dye |
| 11,397,651 B2 | 7/2022 | Dye |
| 11,397,652 B2 | 7/2022 | MacCarthaigh |
| 11,411,808 B2 | 8/2022 | MacCarthaigh |
| 2005/0193227 A1 | 9/2005 | Nakahara |
| 2005/0283658 A1 | 12/2005 | Clark |
| 2006/0047776 A1 | 3/2006 | Chieng |
| 2007/0006015 A1 | 1/2007 | Rao |
| 2007/0180314 A1 | 8/2007 | Kawashima |
| 2008/0294933 A1 | 11/2008 | Nishii |
| 2009/0228589 A1 | 9/2009 | Korupolu |
| 2009/0290483 A1 | 11/2009 | Curtis |
| 2010/0325473 A1 | 12/2010 | Agneeswaran |
| 2011/0099146 A1 | 4/2011 | McAlister |
| 2011/0145243 A1 | 6/2011 | Yudenfriend |
| 2011/0239215 A1 | 9/2011 | Sugai |
| 2014/0059379 A1 | 2/2014 | Ren |
| 2014/0317441 A1 | 10/2014 | Arata |
| 2015/0178137 A1 | 6/2015 | Gordon |
| 2015/0370659 A1 | 12/2015 | Pershin |
| 2016/0004552 A1 | 1/2016 | Innan |
| 2017/0230451 A1 | 8/2017 | Paramasivam |
| 2017/0339065 A1 * | 11/2017 | Li ............... H04L 47/801 |
| 2018/0004612 A1 | 1/2018 | Gahlot |
| 2018/0143885 A1 | 5/2018 | Dong |
| 2018/0165166 A1 | 6/2018 | Wang |
| 2019/0235979 A1 | 8/2019 | Li |
| 2019/0250849 A1 | 8/2019 | Compton |
| 2019/0281014 A1 | 9/2019 | Lin |
| 2019/0324874 A1 | 10/2019 | Gill |
| 2020/0042410 A1 | 2/2020 | Gupta |
| 2020/0044966 A1 * | 2/2020 | Krishnan ............ H04L 61/5007 |
| 2020/0104222 A1 | 4/2020 | Ramamoorthi |
| 2020/0257704 A1 | 8/2020 | Du |
| 2020/0285547 A1 * | 9/2020 | Shukla ................ G06F 11/1464 |
| 2020/0319890 A1 | 10/2020 | Compton |
| 2021/0004275 A1 | 1/2021 | Avagyan |
| 2021/0144050 A1 * | 5/2021 | Fagan ................. H04L 41/0663 |

FOREIGN PATENT DOCUMENTS

| | | |
|---|---|---|
| WO | WO 2021/108452 | 6/2021 |
| WO | WO 2021/195392 | 9/2021 |

OTHER PUBLICATIONS

Search Report and Written Opinion dated Jun. 1, 2021 issued in PCT/US2020/062090.

International Preliminary Report on Patentability dated Jun. 9, 2022, issued in PCT/US2020/062090.

Zhou et al., "Cloud Service Reliability Enhancement via Virtual Machine Placement Optimization", 2017, IEEE Transactions on Services Computing, pp. 902-913 (Year: 2017).

* cited by examiner

SYSTEMS AND METHODS FOR ENABLING A FAILOVER SERVICE FOR BLOCK-STORAGE VOLUMES

BACKGROUND

Network-based computing, in general, is an approach to providing access to information technology resources through services, such as Web services, where the hardware and/or software used to support those services is dynamically scalable to meet the needs of the services at any given time. In network-based computing, elasticity refers to network-delivered computing resources that can be scaled up and down by a network service provider to adapt to changing requirements of users. For example, the elasticity of these resources can be in terms of processing power, storage, bandwidth, and so forth. Elastic computing resources may be delivered automatically and on-demand, dynamically adapting to the changes in resource requirements on or within a given user's system. For example, a client can use a network service to host a large online streaming service, set up with elastic resources so that the number of webservers streaming content to users scale up to meet bandwidth requirements during peak viewing hours, and then scale back down when system usage is lighter.

A client typically will rent, lease, or otherwise pay for access to the elastic resources accessed through the network service, and thus does not have to purchase and maintain the hardware and/or software that provide access to these resources. This provides a number of benefits, including allowing users to quickly reconfigure their available computing resources in response to changing demands of their enterprise and enabling the network service provider to automatically scale provided computing service resources based on usage, traffic, or other operational requirements. This dynamic nature of network service computing services, in contrast to a relatively static infrastructure of on-premises computing environments, requires a system architecture that can reliably re-allocate its hardware according to the changing needs of its client base and demands on the network-based computing services.

In network-based computing, locations in which applications may be hosted and/or partitioned may be described as regions and/or availability zones. Each region comprises a separate geographic area from other regions and includes multiple, isolated availability zones. Each region may be isolated from all other regions in the network-based computing system. An availability zone is an isolated location inside a region. Each region is made up of several availability zones that each belong to a single region. Also, each availability zone is isolated, but the availability zones in a particular region are connected through low-latency links. When an application is distributed across multiple availability zones, instances may be launched in different availability zones to enable your application to maintain operation if one of the instances fails (for example, by allowing another instance in another availability zone to handle requests for the application).

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
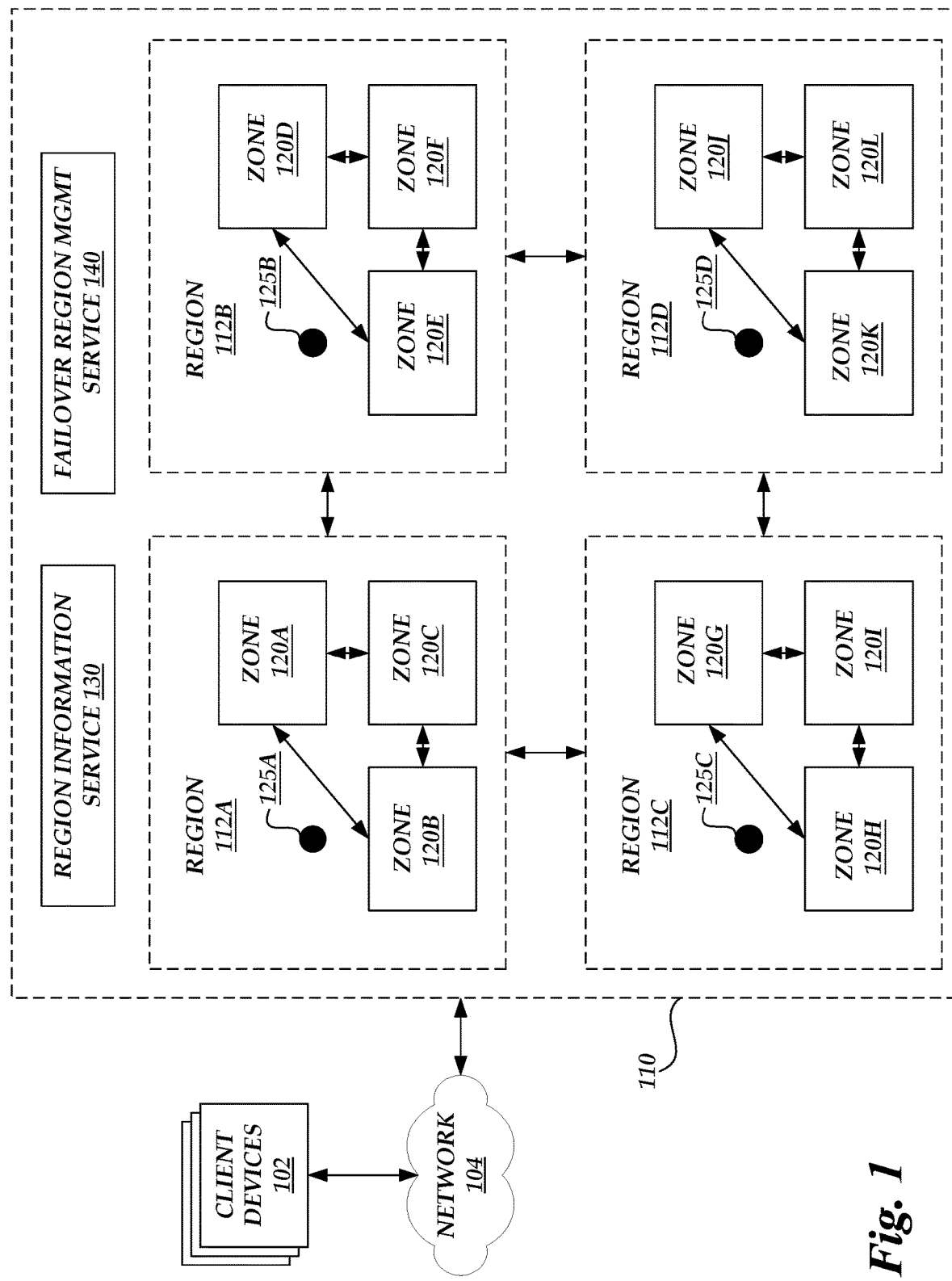
FIG. 1 depicts a schematic diagram of a network service provider in which various embodiments according to the present disclosure can be implemented.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Generally described, aspects of the present disclosure relate to enabling failover between services (e.g., block storage services) housed in multiple regions using routing criteria. A failover service may enable this failover by sharing routing criteria between network devices (e.g., routing devices) that route traffic to services. Therefore, in the event of a failure of the services in a particular region, the traffic can be routed to services in a different region. A virtual machine ("VM") instance can be in communication with an endpoint and may pass the traffic through the endpoint. The endpoint may enable private connections between the VM instance and particular services. The endpoint may be internal to a virtual private environment associated with the VM instance and may receive traffic from the VM instance. The endpoint may process the traffic based on routing criteria associated with the VM instance. The routing criteria may identify how to process the traffic. For example, processing the traffic may correspond to determining whether the traffic complies with access policies based on the routing criteria. The processing may further correspond with forwarding the traffic to a computing device, such as a database service. In order to forward the traffic to the computing device, the endpoint may route the traffic to a network device.

Network devices can enable a virtual machine ("VM") instance to perform certain operations such as reading from and writing to a block storage volume as if the block storage volume were physically coupled to the instance. However, particularly in the context of cloud computing, the block storage volume may not be physically coupled to the instance, or even to the host computing device physically hosting the instance. Instead, the service may be connected to the VM instance via a network, and a distributed set of network devices may facilitate interaction between the VM instance and the service such that the VM instance can treat the service as local.

Aspects of the present disclosure further relate to the management of network-based failover services in a network-based computing system. In the network-based computing system, the services may be distributed across various isolated computing systems (referred to as "availability zones" or regions). When distributed as such, each zone or region may host a partition of the services. Further, network devices may be linked to a specific zone or region associated with a specific partition of services. A given network device may therefore route traffic to a particular subset of services located in a particular region or zone.

One or more VM instances may be implemented in a region or zone. Individual VM instances may route traffic through an endpoint to a network device associated with the same region or zone. Further, the network device can route the traffic to a partition of services associated with the same region or zone.

Individual VM instances may be provided load-balanced access to a pool of computing devices that implement the services, using one or more global network addresses. More specifically, a distributed set of network devices may be reachable via global network addresses, which network devices can select and route requests to computing devices within the pool based at least partly on load balancing the requests. In one embodiment, the network devices utilize anycast routing techniques to advertise availability of global network addresses associated with the pool of computing devices, thereby attracting traffic addressed to those addresses. On receiving a request to access the pool, a network device may select an appropriate computing device within the pool based on a distribution algorithm that facilitates a distribution of packets to different computing devices. The network device may then act as a proxy, routing the request to the computing device and facilitating further communications between the VM instance and the computing device. The network device may implement a variety of techniques, as disclosed herein, to provide resilient, efficient access to the pool of computing devices implementing the services. By utilizing anycast advertisements, the network devices may distribute requests among the pool even when the requests are addressed to a single network address, avoiding complications and delays associated with other techniques, such as DNS-based load balancing. By acting as a proxy between clients and the pool of computing devices, rather than serving resources directly, the network devices may control distribution of requests to the pool independently of how external devices choose to route the requests based on the specified anycast address, thus avoiding detriments associated with traditional anycast-based networking.

Embodiments of the present disclosure may illustratively be implemented in a wide geographic area. In one embodiment, the present disclosure is implemented on the worldwide Internet, and provides global internet protocol (IP) addresses, such as IP version 4 (IPv4) or IP version 6 (IPv6) addresses. Different data centers may exist in different geographic locations, and each data center may include one or more computing devices providing access to a network-based service. Examples of such services include, but are not limited to, web hosting, data storage, on-demand compute services, and the like. The resources at each data center may be limited, and thus an operator of the network-based service may wish to distribute load among such services. To simplify operation of the network-based service (e.g., avoiding the complications related to DNS-based load balancing), it may be desirable to provide the operator with a single set of relatively static network addresses for the service, which network addresses are manageable independently of the individual endpoints providing access to the service. Such network addresses are generally referred to herein as "global" network addresses. As used herein, the term "global" is intended to refer to the scope of the network address with relation to the service (e.g., that the network address applies to the entire service, rather than individual devices), and does not necessarily imply that such a network address is accessible worldwide. Nevertheless, embodiments of the present disclosure may be implemented to provide global network addresses that are generally accessible from a worldwide network, such as the Internet.

The distributed set of network devices may route data from the VM instance to a service based on the routing criteria. The routing criteria can include an endpoint policy and/or a service policy (e.g., a bucket policy). The endpoint policy may identify particular services that an endpoint is authorized to communicate with and the service policy may identify particular endpoints that are authorized to communicate with a service. The endpoint policy may maintain a private connectivity nature of network traffic. The network traffic may be sent from the VM instance to the service without exposing the network traffic to the public internet. By routing traffic according to the routing criteria, the traffic may not be sent over the public internet and may reduce exposure to brute force and distributed denial-of-service attacks. The VM instance can provide the endpoint policy to a particular network device associated with the same region as the VM instance in order to determine how to route traffic. Therefore, the network device can utilize the routing criteria to determine how to route traffic from the VM instance.

In the unlikely event that one of the zones or regions fails, partitions of services hosted by the other zones or regions provide redundancy or failover, allowing the customers to continue writing data to the services based on the resources in the other zones or regions. More specifically, aspects of the present disclosure relate to providing network-based failover services that enable predictable, controlled, and reliable failover. The distributed set of network devices may enable the network-based failover service. The network-based failover services facilitate the management of one or more failover regions to failover into in the event of a failure of a current or designated region. The network-based failover service may enable failover into a failover region by transmitting routing criteria from a network device associated with the current region to a network device associated with the failover region. By replicating the routing criteria of the current region into a failover region, the network-based failover service can enable the network device associated with the failover region to route data in the same manner as the network device associated with the current region. Further, the routing criteria can be sent to multiple network devices in order to maintain that private nature in the event of a failover.

In some embodiments, the routing criteria may not be replicated to failover regions. Instead, each network device of the distributed set of network devices may obtain a list of endpoint policies associated with possible failover regions. Upon determining that a failure event has occurred, the access point can rewrite the endpoint policy of the traffic according to an endpoint policy associated with a failover region. By rewriting the endpoint policy of the traffic, the network device can route data to a failover region.

Further, the network-based failover services can identify target failover regions and utilize processing rules to determine which target failover regions can be characterized as "available" for failover based on information such as capacity, readiness, and the like. Still further, for target failover regions that have been characterized as "unavailable" or have not been otherwise characterized as "available," the network-based failover services can further implement remediation processes to modify or supplement the list of available target regions. The remediation process can illustratively be implementing manually or automatically and can be customized to allow for one or more failover regions to achieve a characterization of available.

Existing mechanisms for managing failovers are overly complicated, significantly increase design work required by customers, and lack features that provide the customer visibility and control over the mechanisms. Traditionally, traffic from a VM instance may be routed to a partition of services in the same region as the VM instance using associated routing criteria. Upon determining that a particular region is unavailable, a customer may be required to instantiate a new VM instance in a new region in order to manually failover traffic. Such a process can be inefficient and costly. The present disclosure addresses such problems by providing a system for managing network-based failover services (sometimes referred to as "failover services") that better coordinates failover workflow design and execution while maintaining data integrity of the data associated with the VM instance. The system for managing failover services described herein supports a wide range of failover use cases.

The network-based failover services of the present disclosure improve upon the faults of the existing mechanisms in various ways. The system for managing failover services of the present disclosure enables an access point to route traffic based on routing criteria associated with the virtual machine originating the request. As described above, in some embodiments, an access point in a current region may determine that a failure has occurred in the current region. The access point of the current region can route the traffic to an access point in a failover region. To ensure that each access point routes traffic from the VM instance based on the same routing criteria, the access point can replicate routing criteria among one or more additional access points. Therefore, upon receiving network traffic from a remote region, the access point can route the traffic based on routing criteria associated with the VM instance hosted by the remote region.

These and other aspects of the disclosure will now be described with regard to certain examples and embodiments, which are intended to illustrate but not limit the disclosure. Although the examples and embodiments described herein will focus on, for the purpose of illustration, specific calculations and algorithms, one of skill in the art will appreciate the examples are illustrative only, and are not intended to be limiting.

FIG. 1 depicts an example computing environment 100 in which a network service provider 110 provides network-based services to client devices 102 via a network 104. As used herein, a network service provider 110 implements network-based services 110 (sometimes referred to simply as a "network-based services 110" or a "services 110") and refers to a large, shared pool of network-accessible computing resources (such as compute, storage, or networking resources, applications, or services), which may be virtualized or bare-metal. The network service provider 110 can provide convenient, on-demand network access to the shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network 104 and the hardware and software in the network service provider 110 that provide those services.

As shown in FIG. 1, the network service provider 110 is illustratively divided into a number of regions 112A-D. Each region 112 may be geographically isolated from other regions 112. For example, region 112A may be geographically located on the U.S. east coast, region 112B may be geographically located on the U.S. west coast, region 112C may be geographically located in Europe, region 112D may be geographically located in Asia, etc. While four regions 112 are shown in FIG. 1, a network service provider 110 may include any number of regions. Each region 112 is illustratively in communication via a network, which may be a private network of the system 110 (e.g., privately owned circuits, leased lines, etc.) or a public network (e.g., the Internet).

In FIG. 1, each region 112 is further shown as divided into a number of zones 120 (across all regions 112, zones 120A-L), which may also be referred to as availability zones or availability regions. Each zone 120 illustratively represents a computing system that is isolated from the systems of other zones 120 in a manner that reduces a likelihood that wide-scale events, such as natural or man-made disasters, impact operation of all (or any two) zones 120 in a region. For example, the computing resources of each zone 120 may be physically isolated by being spread throughout the region 112 at distances selected to reduce a likelihood of a wide-scale event affecting performance of all (or any two) zones 120. Further, the computing resources of each zone 120 may be associated with independent electric power, and thus be electrically isolated from resources of other zones 120 (though the resources may still communicate with one another via a network, which may involve transmission of electrical signals for communication rather than power), independent cooling systems, independent intra-zone networking resources, etc. In some instances, zones 120 may be further isolated by limiting operation of computing resources between zones 120. For example, virtual machine instances in a zone 120 may be limited to using storage resources, processing resources, and communication links in that zone 120. Restricting inter-zone cloud or network-based computing operations may limit the "blast radius" of any failure within a single zone 120, decreasing the chances that such a failure inhibits operation of other zones 120. Illustratively, services provided by the network service provider 110 may generally be replicated within zones 120, such that a client device 102 can (if they so choose) utilize the network service provider 110 entirely (or almost entirely) by interaction with a single zone 120.

As shown in FIG. 1, each zone 120 is in communication with other zones 120 via the communication links. Preferably, the communication links between the zones 120 represent high speed, private networks. For example, zones 120 may be interconnected via private fiber optic lines (or other communication links). In one embodiment, the communication links between zones 120 are dedicated entirely or partially to inter-zone communication, and are separated from other communication links of the zone(s). For example, each zone 120 may have one or more fiber optic connections to each other zone, and one or more separate connections to other regions 112 and/or the network 104.

Each zone 120 within each region 112 is illustratively connected to the network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. While the system 110 is shown in FIG. 1 as having a single connection to the network 104, multiple connections may exist in various implementations. For example, each zone 120 may have one or more connections to the network 104 distinct from other zones 120 (e.g., one or more links to an Internet exchange point interconnecting different autonomous systems on the Internet).

Each region 112A-112D includes an endpoint 125A-125D, respectively. The endpoints 125A-125D may comprise computing devices or systems through which the customer's application can access the network-based services 110. Information provided to one of the endpoints 125 may be propagated to all other endpoints 125. Each region 112 may include more than one endpoint 125 or each region 112 may not include even one endpoint 125.

With continued reference to FIG. 1, the network service provider 110 further includes a region information processing service 130 and a failover region management service 140. As will be described in greater detail below, the region information processing service 130 can be configured to determine a target set of regions that can be designated as a primary region and one or more target failover region for an individual customer or set of customers. For example, the region information processing service 130 can process customer specific criteria to determine which region will be designated as a primary region. The region information processing service 130 can further select target failover regions based on selection criteria as described herein. The failover region management service 140 can be configured to receive the target set of failover regions and characterize the availability of at least some portion of the one or more target failover regions based on application of one or more processing rules. Illustratively, individual processing rules can correspond to an identification of a parameter and one or more thresholds associated with the identified parameter. The parameters correspond to resources configurations or performance metrics that define the ability for a target region to be considered an available failover region. The processing rules may be configured by a customer, the network service provider, or a third party. Additionally, the processing rules may be derived, in part, on the attributes or parameters of the designated primary region (e.g., matching the current attributes of a designated primary region). The failover region management service 140 can further implement a processing engine that can implement processes responsive to a determined list of available or unavailable failover regions. The processing engine can illustratively implement one or more remediation processes that can attempt to modify or supplement target regions that were not determined as available based on the previous application of the processing rules. The processing engine can further implement readiness processes that can be utilized to determine whether the previously determined available failover regions are operationally ready or operable to function in a failover capacity. The results of the failover processes (e.g., remediation or readiness processing) can be utilized to modify or update the list of available failover regions.

Client computing devices 102 can include any network-equipped computing device, for example desktop computers, laptops, smartphones, tablets, e-readers, gaming consoles, and the like. Users can access the network service provider 110 via the network 104 to view or manage their data and computing resources, as well as to use websites and/or applications hosted by the network service provider 110. For example, users may access an application having a partition hosted by a zone 120A in the region 112A (for example, a primary) and a zone 120L in the region 112D (for example, a secondary partition).

In accordance with embodiments of the present disclosure, the application having partitions hosted in different zones may be able to withstand a failure in one of the zones 120 or regions 112 in which one of the partitions is operating. For example, if the primary partition hosted in zone 120A experiences a failure, any requests that would normally be handled by the primary partition in the zone 120A may be instead routed to and handled by the secondary partition running in the zone 120L. Such a failure may result in a failover scenario, where operations of the primary partition are transferred to the secondary partition for handling. Failover scenarios may involve manual actions by the customer associated with the application to request routing of communications and so forth from the primary partition to the secondary partition. However, embodiments of the present disclosure can also provide a highly available, managed failover service for applications having partitions hosted in different zones that enables the customer's application to withstand zone or region failures with reduced or minimal interaction from the customer during a failover scenario while maintaining data integrity during such failures and failovers. As described above with reference to FIG. 1, a customer application may include partitions hosted in a number of different zones 120 in the same or different regions 112. Each partition may comprise identical nodes (for example, worker nodes), where each node represents and/or is mapped to any combination of compute, storage, database, and networking resources. One or more of the partitions may be hosted in a zone that experiences a failure (for example, a hardware failure). The failover service described herein manages steps or actions (for example, failover workflows) in the event of such a failure. The partitions (or nodes) may operate in and transition between different states; the failover service may identify the state in which each partition is operating and cause one or more partitions change or transition between states at any given time. In some embodiments, nodes within a partition may operate in the same state as the partition or in a different state from the partition. The available states in which the partitions (or nodes) may operate are provided with reference to FIG. 2.

Figure 2:
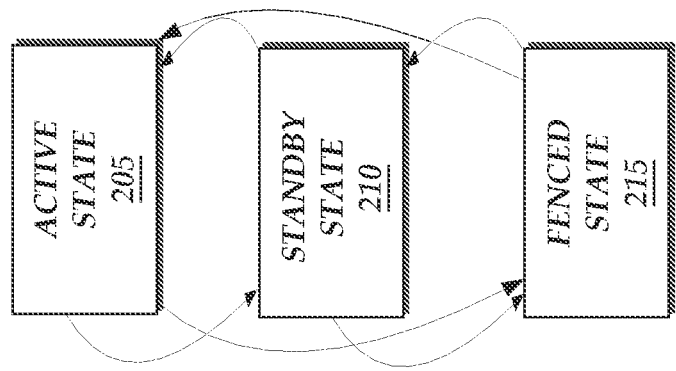
FIG. 2 depicts an example of a state machine diagram for application cells hosted in different zones of the network service provider as shown in FIG. 1.

FIG. 2 depicts an example of a state machine diagram for application cells hosted in different zones 120 of the network-based services 110 as shown in FIG. 1. As shown, the state machine diagram defines three distinct states that are available to the application partitions and nodes (sometimes referred to herein as application cells) hosted by the network-based services 110: an active state 205, a standby (or passive) state 210, and a fenced state 215. In some embodiments, the three shown states are the only available states. In some embodiments, additional or fewer states are available. Though reference below is made to the application partitions, the following discussion regarding states applies equally to the application nodes.

When in the active state 205, the application partition may receive and process queries (for example, read and write queries) or requests received from other entities. In some embodiments, the queries or requests comprise any operation that the application is capable of performing. For example, the read query comprises an operation where the partition reads or accesses data in a storage in the zone without manipulating any data in the storage. The write query may comprise an operation where the partition writes or modifies data in the storage. Thus, in the active state, the partition may operate with full capabilities, enabled to process any queries or requests the partition receives and which the partition is capable of processing. In some embodiments, a limited number of partitions operate in the active state 205 to protect from data overwrites and/or data losses. For example, only one partition operates in the active state 205 at any given moment. This may help maintain data integrity between different partitions by not allowing more than one partition to make changes to or modify (for example, write) data corresponding to the application. In some embodiments, the partition in the active state 205 is hosted by a zone that is not experiencing any failure.

When in the standby state 210, the partition may not receive or process any queries or requests. For example, the partition in the standby state 210 may not be accessible to entities using the application and/or may be unable to read from or write to the storage in the zone. Thus, in the standby state 210, the partition may not operate with any capabilities and may be disabled from processing any queries or requests the partition receives. In some embodiments, any number of partitions operate in the standby state 210, as partitions operating in the standby state 210 do not overwrite data or create data losses.

When in the fenced state 215, the partition may receive and process read queries or requests but not process any write queries. For example, the partition in the fenced state 215 may be accessible to entities requesting read operations from the storage but not accessible to entities requesting write operations for data in the storage. Thus, in the fenced state 215, the partition may operate with partial capabilities, enabled to process only read queries or requests the partition receives and which the partition is capable of processing. In some embodiments, any number of partitions operate in the fenced state 215, as partitions operating in the fenced state 215 do not overwrite data or create data losses. In some embodiments, the partition in the fenced state 215 is hosted by a zone that is experiencing or recently experienced a failure that prevents the partition from operating properly or that could adversely impact operation of the partition. In some embodiments, the customer defined the partition as being in the fenced state 215 irrespective of the state of the zone hosting the partition. By allowing the partition to operate in the fenced state 215, the partition may continue to service some requests (for example, the read requests only) while refraining from modifying information or data relevant to the application in the storage until the fenced partition changes state to the active state 205. Such a restriction may maintain data integrity by not allowing the partition to write over data while experience a failure or while another partition is operating in the active estate 205.

Overview of Zone and Managed Failover

Figure 3:
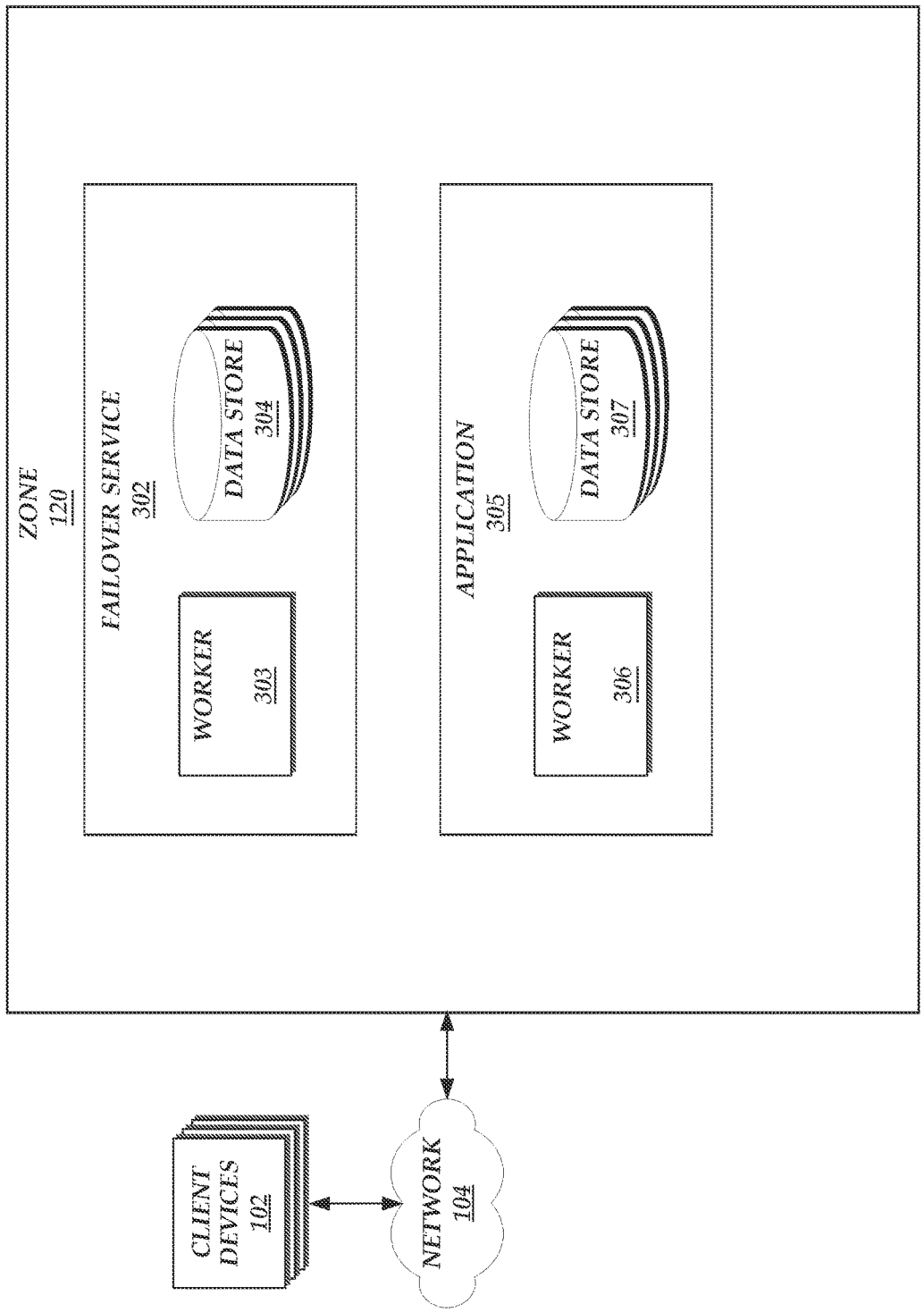
FIG. 3 depicts a schematic diagram of a zone of the network service provider of FIG. 1, including a failover service configured to implement failover between cells for an application in accordance with aspects of the present disclosure.

FIG. 3 depicts an example configuration of a zone 120A. As noted above, a zone 120 may represent an independent, isolated computing system providing a variety of services to or hosting a variety of applications accessible by client devices 102 independent of the computing systems of other zones 120. Thus, each zone may include a variety of computing, storage, and network resources that provide various services to client devices 102, as well as components to facilitate creation and management of such resources. One skilled in the art will therefore appreciate that the illustrative configuration of FIG. 2 is simplified for ease of description.

As shown in FIG. 3, the zone 120A includes the failover service 302, corresponding to the failover service described herein. Generally described, the failover service 302 enables the customer to control which application cells serve traffic for the application 305 and which cells do not. FIG. 3 also shows the client devices 102 that communicate with the zone 120A and define and monitor states for application cells (i.e., partitions or nodes) that provide the applications 305 to users. In some embodiments, each node of the partitions of the application 305 is associated with a state. In some embodiments, the nodes of a particular partition takes the state of the partition to which it belongs. In some embodiments, the individual nodes in the partition can have different states from each other or from the partition.

The failover service 302 shown in FIG. 3 may be a representation of a partition of the failover service 302. As used herein, the terms failover service and failover service partition may be used interchangeably. The partition of the failover service 302 shown in FIG. 3 includes a worker 303 comprising a node mapped to or corresponding to a compute resource. The failover service 302 also includes a storage 304, which may comprise a node mapped to a storage or database resource in which the failover service 302 may store data used by the failover service 302, such as state data, workflows, and so forth. The other partitions of the failover service 302 in other zones 120 may be identical to the failover zone 302 of FIG. 3.

This zone 120A also includes an application 305. The application 305 as shown may be a representation of a partition of a partitioned application 305. As used herein, the terms application and application partition may be used interchangeably. The partition of the application 305 shown in FIG. 3 includes a worker 306 comprising a node mapped to or corresponding to a compute resource. The application 305 also includes a storage 307, which may comprise a node mapped to a storage or database resource and in which the application 305 may store data used by or relating to the application 305. The other partitions of the application 305 in other zones 120 may be identical to the application 305 of FIG. 3.

In some embodiments, network service provider 110 may ensure that the storage 304 of the failover service 302 is up-to-date with the storage of other partitions of the failover service 302 by propagating changes (for example, state change information) between the failover service 302 storages 304. In some embodiments, the network-based services 110 propagates the changes at a predetermined, dynamic, or customizable interval (for example, every 1 second, 1 minute, and so forth).

In some embodiments, network-based services 110 may ensure that the storage 307 of the application 305 is up-to-date with the storage 307 of other cells of the application 305. The network-based services 110 may propagate changes (for example, changes to the data stored in the storage 307) between the application storages 307. In some embodiments, the network-based services 110 propagates the changes at a predetermined, dynamic, or customizable interval (for example, every 1 second, 1 minute, and so forth).

Details of how the network-based services 110 uses the failover service 302 to define states for application cells and manage failover in the event of zone 120 or region 112 failures are discussed below.

In some embodiments, the network-based services 110 provides the highly available, managed failover service 302 for customer applications 305 distributed across any combination of zones 120, regions 112, and on-premises. As described herein, the failover service 302 itself may be distributed across multiple regions 112 and/or zones 120. For example, the failover service 302 may be partitioned between zones 120 in two or more of the regions 112A, 112B, 112C, and 112D. Such partitioning of the failover service 302 may ensure that at least one partition of the failover service 302 is always available, thereby ensuring that the failover service 302 is always available, even in the event that one or more zones between the regions 112A, 112B, 112C, and 112D fail at the same time. As such, the failover service 302 may be highly available.

Additionally, due to the partitioning of the failover service 302, the failover service 302 is able to serve as the authoritative source for state information for application partitions and nodes hosted by the network-based services 110. More specifically, by storing copies of state information and failover workflows for the application 305 distributed across multiple storages 304 of the partitions of the failover service 302, the failover service 302 is able to ensure that information matches between multiple storages 304 such that the information provided is more likely to be valid and accurate. For example, each partition of the failover service 302 includes a copy of state information for the application cells hosted by the network-based services 110 in the storage 304. Accordingly, the failover service 302 may guarantee strong consistency of state information for the application cells reported to the application cells or other entities. For example, to guarantee that the state reported by the failover service 302 is correct, the failover service 302 may confirm that a quorum of storages 304 of the failover service 302 indicates the state same state that is being reported. More specifically, before the failover service 302 can guarantee that a primary partition of the application 305 is in the active state 205, the failover service 302 may confirm that a majority of failure service storages 304 indicate that the primary partition of the application 305 is in the active state 205.

If the majority of failure service storages 304 does not indicate the active state 205, then the failover service 302 does not report that the primary partition of the application 305 is in the active state 205. In some embodiments, the quorum is a majority of the failure service storages. In some embodiments, the quorum is a set number (for example, three (3) or five (5)) of failover service storages 304 that must agree for the failover service 302 to guarantee that state (or other information) being reported.

In some embodiments, the customer may generate rules (or limitations) for its applications or the failover service 302 may include rules that limit how many partitions and/or nodes of the application 305 may operate in a given state. In some embodiments, the failover service 302 configures and enforces such rules. For example, the failover service 302 may allow the customer to identify, for example, how many partitions or nodes can operate in each state at any given moment. For example, the failover service 302 may limit a number of partitions or nodes allowed in the active state 205 to one (1) while allowing an unlimited number of partitions or nodes in each of the standby state 210 or the fenced state 215. In some embodiments, the failover service 302 may also limit the number of partitions or nodes allowed in the fenced state 215 to one (1). In some embodiments, by limiting the number of partitions or nodes that can write to a corresponding application storage to one, risks of data overwrite and data loss are mitigated. Additionally, such rules may enable the failure service to trigger manual and/or automated failovers. A manual failover may comprise the customer identifying to the failover service 302 and the network-based services 110 the change of states for, for example, the primary partition and the secondary partition. An automated failover may comprise the customer identifying that the primary partition changes state and the failover service 302 or the network-based services 110 identifying and performing subsequent workflow actions based on a generated failover workflow.

In some embodiments, the network-based services 110 utilizes a user interface (not shown in the figures) to enable the customers whose applications 305 are hosted by the network-based services 110 to create dependency trees and failover workflows for their applications 305. The dependency trees may map (for example, identify) and track upstream and downstream dependencies for the customer's applications to determine the steps to take in a failover to ensure data integrity between the application partitions and continued availability of the application 305. Furthermore, the failover service 302 and/or the network-based services 110 may map the upstream and/or downstream dependencies of sub-applications of the customer applications. Based on the mapped partitions and dependencies, the failover service 302 and/or the network-based services 110 may coordinate partition or node failover in a sequential manner for any of the individual applications provided by the network-based services 110. In some embodiments, the dependencies may comprise other applications or services that provide data, requests, and so forth to the application 305 or that receive data, requests, and so forth from the application 305.

In some embodiments, the interface is also used to identify failover workflows to be triggered based on the failover states and/or other conditions. The dependency trees and the workflows may be created when the customer designs and creates the application 305 or after the application 305 is created and partitioned. Such dependency trees and failover workflows may enable to the failover service 302 and the network-based services 110 to provide visibility into particular dependencies for the application 305. For example, enabling the customer to see its application's upstream and downstream dependencies, the customer may better understand what sequence of steps or actions are needed during a failover of an application partition or node to ensure availability of the application 305 and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such the failover workflows may be manually triggered by the customer or automatically triggered by the failover service 302 based on the failover states of application partitions or nodes. By tracking the application dependencies and corresponding workflows, the network-based services 110 and failover service 302 may enable customers to orchestrate failover procedures for applications 305 in a safe, reliable, and predictable manner that maintains data integrity and application availability.

In some embodiments, the customer models their application and/or cells of their application using the failover service 302. The cells, as used herein, may represent partitions, nodes, or any unit of the application that could be a point of or experience a failure, for example, in a zone 120 or region 112. The customer can use the models of the failover service 302 to define the sequence of steps needed during the failover across one or more applications based on the dependency trees and the like. For example, if the customer detects a failure in the primary partition of the application 305, the customer can trigger an auto-scaling step to scale applications 305 in the secondary partition, after which the customer can trigger a traffic management service to redirect user traffic to the secondary partition. In some embodiments, the traffic management service manages network level routing of traffic. Such controls enable the customer to manage distributed, multi-tier applications in a controlled, reliable, and predictable manner. In some embodiments, the traffic management service routes traffic to an optimal application endpoint based on various parameters relating to performance of the application. In some embodiments, the customer can generate the workflow to include the actions identified above in the event the failure is triggered such that the actions are performed automatically by the failover service 302.

Similarly, the failover service 302 may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change triggers a failover or changing of endpoint or traffic weights per zone 120 or region 112 for the traffic management service and/or the DNS service (also referred to herein as the routing service), which may enable automation of failover workflows and/or sequences of steps.

In some embodiments, the failover service 302 and the network-based services 110 enable simplified aggregation and tracking of events associated with the customer applications 305, including event history logs and the like. Thus, the customer may use the network-based services 110 to generate reports and/or audit trails of various events, such as state changes and/or details of failover workflows, such as visibility into a current failover workflow step or stage. Such reports or audit trails may enable ease of operations tracking and/or compliance.

Operation of Failover Services

As described herein, the failover service 302 for the customer application 305 may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure (for example, the standby state 210 or the fenced state 215). Though reference herein is made to primary and secondary partitions, the failover services and the failover workflow may apply equally to primary and second nodes.

In some embodiments, the network-based services 110 of the failover service 302 stores the failover workflow generated by the customer in the storage 304 associated with the failover service 302. Alternatively, or additionally, the workflow is stored in a storage of the network-based services 110, in a storage 307 associated with the application 305, or in an external storage. The workflow may be accessed as needed when the primary partition changes state, when the customer indicates or requests the failover, or when the failover service 302 requests the failover. Once the failover workflow is stored, the failover services 302 may await a state change or other condition that triggers the failover workflow, for example a state change of the primary partition.

The customer may assign one of the mutually exclusive states described above (the active state 205, the standby state 210, and the fenced state 215) to each partition of the application 305. Such assignment of states may be communicated to the failover service 302. In some embodiments, the primary partition is in the active state 205 when the failover workflow is stored and the secondary partitions are in the standby state 210. When the primary partition is operating in the active state 205, the DNS service or the traffic management service may direct traffic (for example, read and write requests) for the application 305 to the primary partition.

In some embodiments, the failover service 302 may determine that the state of the primary partition changes, for example from the active state 205 to the fenced state 210. In some embodiments, the failover service 302 may detect the change in the state of the primary partition based on receiving an indication from the customer or from automatically detecting a change in the state of the primary partition made by the customer. In response to this change of state of the primary partition, the failover service 302 may reference the failover workflow for the corresponding application to identify what actions to take. For example, the failover service 302 identifies the secondary partition that is to operate as the backup to the primary partition. In some embodiments, the secondary partition that operates as the backup to the primary partition is the secondary partition that enables or maintains a largest similarity of dependencies as the primary partition, thereby reducing changes in upstream and/or downstream dependencies as much as possible. In some embodiments, when the primary partition changes to the fenced state 215, the workflow includes instructions for the DNS service and/or the traffic management service to direct read requests to either of the primary partition or the backup secondary partition and to direct all write requests to the backup secondary partition that operates as the backup. Alternatively, when the primary partition changes to the standby state 210, the failover workflow instructs the DNS service and/or the traffic management service to direct all read and write requests to the backup secondary partition. In some embodiments, the failover workflow identifies the sequence of states into which the primary and secondary partitions transition along with failover step or action sequences. Further details of the operation of the failover service with respect to the change of state of the primary partition are provided below with respect to FIG. 4.

In some embodiments, the failover workflow for the application 305 may additionally or alternatively comprise one or more actions or steps to be taken should a secondary partition or node experience a failure. For example, should the backup secondary partition experience a failure, the failover workflow may identify an alternative backup secondary partition from remaining secondary partitions.

The failover workflow may comprise one or more reconciliation steps comprising one or more actions that ensure that the secondary partition is prepared to transition to the active state 205 (for example, confirming that the primary partition has transitioned from the active state 205 to another state) while maintaining data integrity until and through the transition. In some embodiments, the one or more reconciliation steps also include the step of instructing the traffic management service and/or the DNS service to route requests to the secondary partition. Once the one or more reconciliation steps are completed, the secondary partition may be promoted from the standby state 210 (or the fenced state 215) to the active state 205, and all requests associated with the application may be routed to the secondary partition in the active state 205. The failover service may replicate the state change information for the primary and secondary partitions post failover in the corresponding storages in the zones 120 and regions 112 in which the failover service application is partitioned. By updating the state change information for the primary and secondary partitions post failover, the failover service may provide a consensus or quorum view of current states for the primary and secondary partitions.

As described above with reference to FIG. 1, customer applications may be partitioned across zones 120, regions 112, and/or on-premises (for example, for disaster recovery purposes). In some embodiments, the partitions are identical and comprise identical nodes, where each node represents and/or is mapped to any combination of compute, storage, database, and networking resources. In some embodiments, each node polls the failover service 302 or the network-based services 110 to determine the current state of the node. As such, state conditions can trigger particular actions at the node level for the failover workflow.

The failover service 302 or the network-based services 110 may track states of nodes, partitions, and other components of the network-based services 110 in the storage 304. In some embodiments, the failover service 302 and/or the network-based services 110 may receive updated state information from the customer or automatically by determining or detecting a node, partition, zone 120, or region 112 is experiencing a failure. When the updated state information is received, the failover service 302 may attempt to update or propagate the storages 304 in all the failover service partitions 302, as described above.

Figure 4:
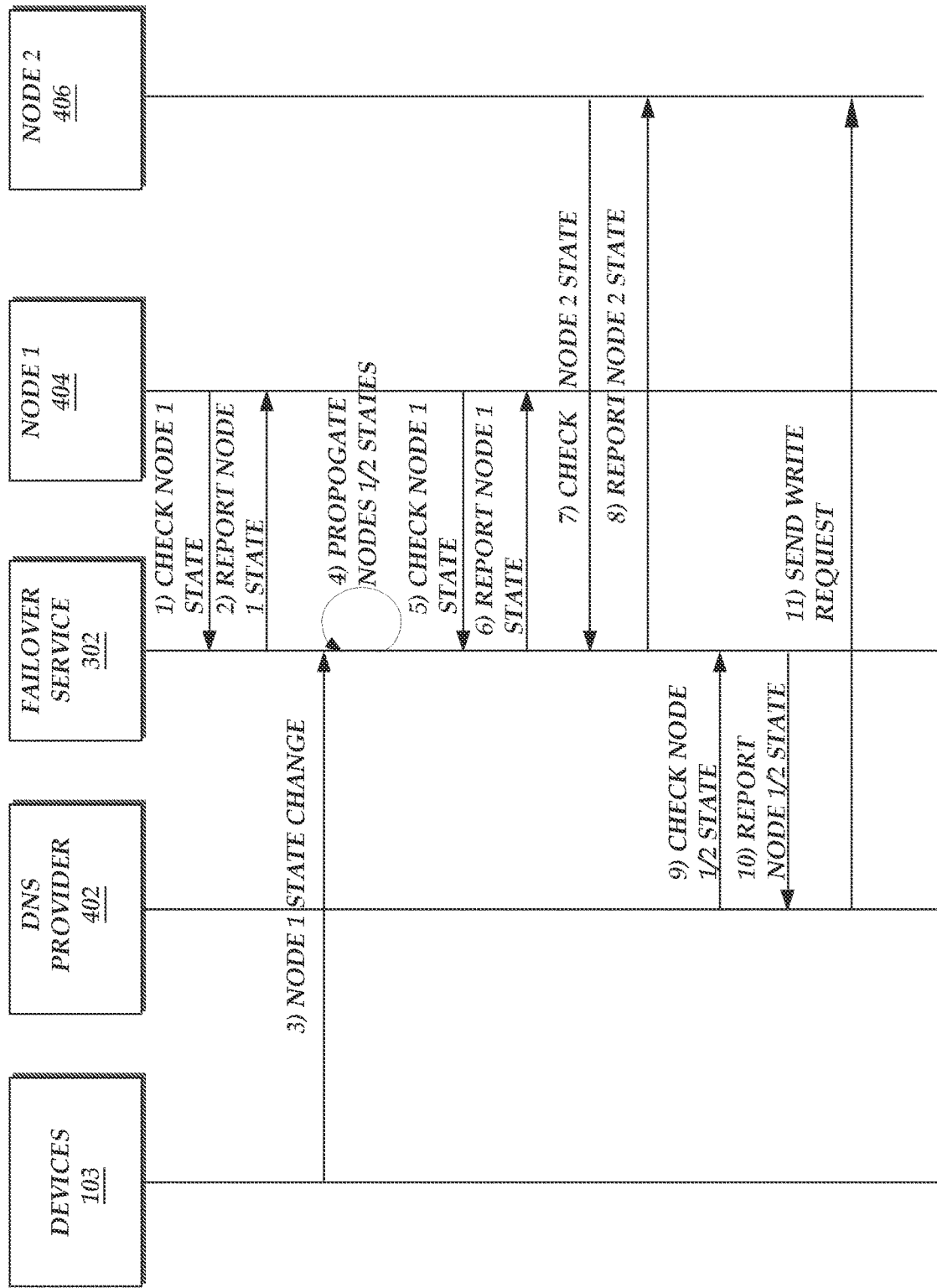
FIG. 4 depicts an example workflow of interactions that implement the highly available failover service of FIG. 3 in accordance with aspects of the present disclosure.

With respect to FIG. 4, an example workflow of interactions that implement the highly available failover service 302 is shown in accordance with aspects of the present disclosure. As shown in FIG. 4, implementing the highly available failover service 302 involves communications between many devices, systems, or entities. For example, the device 103 (e.g., the client device 102 and/or the network device), the DNS provider or traffic management service 402, the failover service 302, and a plurality of nodes (for example, node 1 404 and node 2 406) communicate when implementing the failover service 302.

At (1), the node 1 404 may poll the failover service 302 to identify the state of the node 1 404. In some embodiments, the polling by the node 1 404 occurs continuously or at predetermined or custom intervals. In some embodiments, the node 1 404 may poll a single partition of the failover service 302 or one or more endpoints of the failover service 302.

At (2), the failover service 302 reports the state for the node 1 404 to the node 1 404. In some embodiments, the failover service 302 only reports the state for the node 1 404 to the node 1 404 when the state is confirmed by a quorum of storages 304 of the failover service 302. As described above, by limiting the reporting of the state to only information confirmed by the quorum of storages, the failover service 302 can guarantee that the state information for the node 1 404 is accurate. For example, at (2), the failover service 302 reports that the node 1 404 is in the active state 205, as confirmed by the quorum of storages 304. Though not shown in FIG. 4, before, at the same time, or after the communications (1) and (2) between the node 1 404 and the failover service 302, the node 2 406 may exchange communications with the failover service 302 to determine the state of the node 2 406, which the failover service 302 may report (after confirming with the quorum of storages 304) as being the standby state 210.

At (3), the devices 103 (e.g., the customer via client devices 102 and/or the network devices) indicate a change of state for the node 1 404 to the failover service 302. In some embodiments, the customer indicates the change of state via an interface with the failover service 302 and/or the network-based services 110 (for example, an application programming interface (API)). As described herein, since the failover service 302 is partitioned or distributed in various zones 120 and regions 112, the customer may access the interface to indicate the change of state at substantially any point in time. As such, the interface and the failover service 302 are highly available. In some embodiments, the failover service 302 may automatically detect a change of state of the node 1 404 (or any other cell) based on a determination that a failure has occurred in a given zone 120 or region 112. Thus, at (3), the devices 102 indicate a change of state for the node 1 404 from the active state 205 to the fenced state 215.

At (4), the failover service 302 propagates the change of state from (3) to the storages 304 distributed in other zones 120 and regions 112. In some embodiments, the propagation of state information occurs at predetermined or customizable intervals or continuously, as described herein. In some embodiments, the propagation of state information may occur bidirectionally for each failover service partition 302, such that each failover service partition 302 updates the state information stored in its storage 304 with state information received from other failover service partitions 302 and causes updates in other storages 304 by transmitting state information updates received from the customer. Thus, at (4), the failover service 302 propagates the node 1 404 fenced state 215 to the storages 304, allowing any partition of the failover service 302 to have access to the same state information for the partitions of the application 305.

At (5), the node 1 404 again polls the failover service 302 to identify the state of the node 1 404. As above, the polling by the node 1 404 may occur continuously or at predetermined or custom intervals. In some embodiments, the node 1 404 may poll a single partition of the failover service 302 or one or more endpoints of the failover service 302.

At (6), the failover service 302 reports the updated fenced state for the node 1 404 to the node 1 404. In some embodiments, the reported state for the node 1 406 does not include any state information for any other node 406 of the application 305. In some embodiments, the failover service 302 only reports the state for the node 1 404 to the node 1 404 when the state is confirmed by a quorum of storages 304 of the failover service 302 (thus after the fenced state is propagated to the storages 304 after (4)). Thus, at (6), the failover service 302 reports that the node 1 404 is in the fenced state 215, as confirmed by the quorum of storages 304.

At (7), the node 2 406 polls the failover service 302 to identify the state of the node 2 406. The different nodes of the application 305 are unaware of states of other nodes of the application 305; as such, the node 2 406 may poll the failover service 302 to identify the state of the node 2 406 to determine whether the node 2 406 needs to prepare itself for any particular actions (for example, to determine whether any failover workflow actions apply to the node 2 406). Similar to the polling by the node 1 404, the polling by the node 2 406 may occur continuously or at predetermined or custom intervals. In some embodiments, the node 2 406 may poll a single partition of the failover service 302 or one or more endpoints of the failover service 302.

At (8), the failover service 302 reports the updated active state for the node 2 406 to the node 2 406. In some embodiments, the reported state for the node 2 406 does not include any state information for any other node 406 of the application 305. In some embodiments, the change in the state of the node 2 406 from standby to active is defied by a failover workflow initiated when the devices 102 indicate the change of state of the node 1 404 to fenced and initiates the failover workflow. In some embodiments, the node 2 406 is the secondary or backup node to the primary node 1 404. When the node 1 404 changes state to the fenced state 215 due, the failover workflow instructs that the secondary node 2 406 take over processing and operations of the primary node 1 406. The failover service 302 may only report the state for the node 2 406 to the node 2 406 when the state is confirmed by a quorum of storages 304 of the failover service 302 (thus after the instructions defining the state of the node 2 406 as being active are propagated to the storages 304 after (4)). Thus, at (8), the failover service 302 reports that the node 2 406 is in the active state 205, as confirmed by the quorum of storages 304.

At (9), the routing service 402 (for example, the DNS service or the traffic management service) polls the failover service 302 to identify the states of the node 1 404 and the node 2 406. As described herein, the routing service 402 may poll the failover service 302 to understand which nodes are active and/or available for processing application requests. In some embodiments, the routing service 402 may poll the failover service 302 for state of the node 1 404 and the node 2 406 continuously or according to a predetermined or customizable interval. In some embodiments, the routing service 402 may poll the failover service 302 for the state of the node 1 404 each time the routing service 402 receives a request to route to the node 1 404 (and so forth).

At (10), the failover service 302 may report the node 1 404 and node 2 406 states to the routing service 402. In some embodiments, the failover service 302 reports the node 1 404 and node 2 406 states to the routing service 402 before the routing service 402 requests the states (for example, automatically at a predetermined or customizable interval). The failover service 302 may only report the state for the node 1 404 and the node 2 406 to the routing service 402 when the states are confirmed by a quorum of storages 304 of the failover service 302. Thus, at (10), the failover service 302 reports that the node 1 404 is in the fenced state 215 and that the node 2 406 is in the active state 205, as confirmed by the quorum of storages 304.

At (11), the routing service 402 routes an application write request to the node 2 406 operating in the active state 205. In some embodiments, when the node 1 404 is in the fenced state 215 and the node 2 406 is in the active state (as determined by polling the failover service 302), the routing service 402 may route read requests to either the node 1 404 or the node 2 406.

Thus, FIG. 4 depicts how different components may interact to identify a change of state or failover and manage a workflow of actions to take when the change of state or failover is initiated.

When customers implement failover workflows using the failover services 302, the network-based services 110 may provide a dedicated infrastructure stack partitioned across multiple regions 112 for the customers to store their application state information in a highly available manner. Using the failover service 302, the customers can launch applications that span across multiple cells. These cells can be any combination of zones 120, regions 112, and on-premises. Within these applications, the cells may be replicated across the zones 120, regions 112, and on-premises. In some embodiments, these cells are mapped to individual or a group of cloud or network-based service and/or storage resources. The customers can set one of the three states (active 205, standby 210, and fenced 215) to each cell. Once the state of a cell is set, the failover service 302 propagate the node states within the infrastructure stack across the multiple regions 112 to get a quorum. The resources that are mapped to these cells may continue (for example, continuously or at an interval) poll the failover service 302 APIs to understand the cell's state. Moreover, the routing service may poll the failover service 302 to understand which resource to route traffic (for example, the received application requests) towards. When the state of a cell is updated, this change is again propagated across the infrastructure stack to get the consensus state. To integrate with the routing service or traffic management service, customers can create a dependency tree and associate the respective cells that are a part of the dependency. For example, to failover traffic between two cells hosted in 2 different regions, customers can create nodes in two partitions and tie the two partitions together in a dependency tree such that the traffic management service is able to route traffic between the two partitions.

Figure 5:
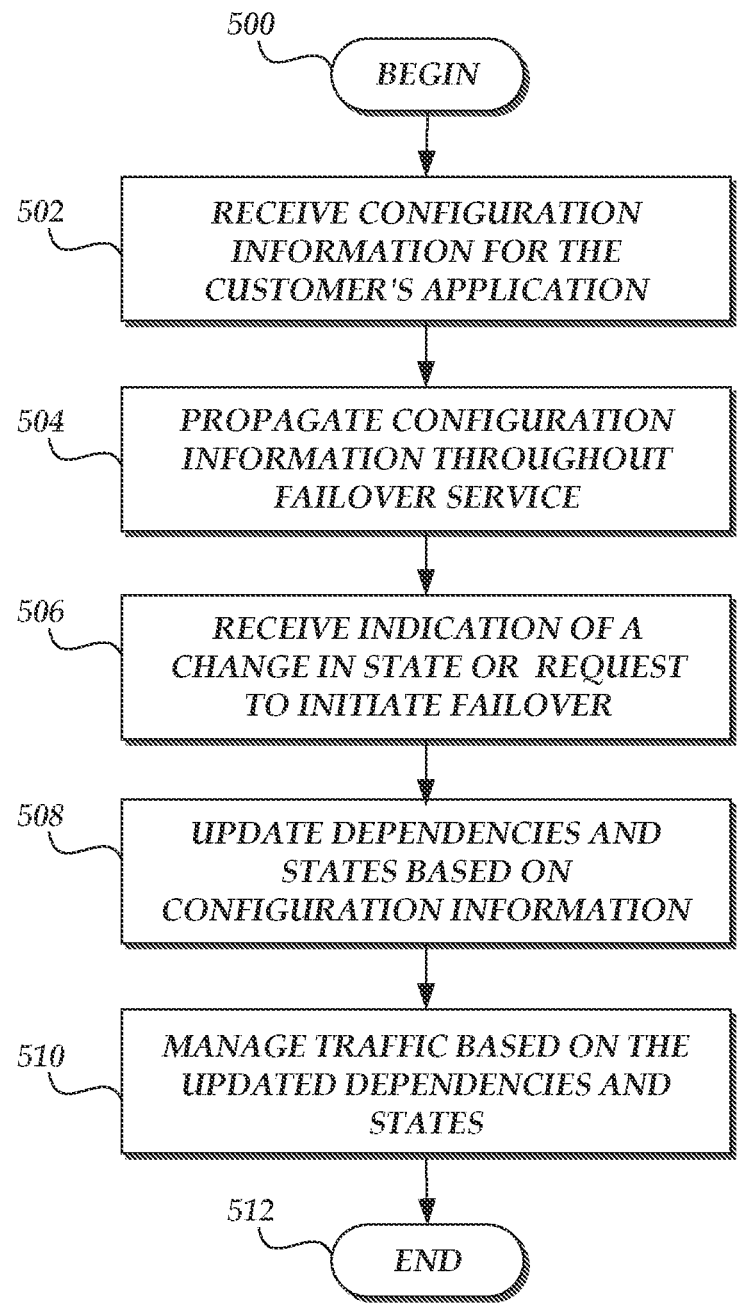
FIG. 5 is a flowchart of an example routine for handling a failover of at least a portion of an application in accordance with aspects of the present disclosure.

With reference to FIG. 5, an illustrative routine will be described for implementing aspects of the present disclosure. Specifically, FIG. 5 depicts an illustrative routine for handling a failover of at least a portion of an application in accordance with aspects of the present disclosure.

With reference to FIG. 5, the routine 500 begins at block 502, where the network-based services 110 or the failover service 302 (for example, the worker 303) receives configuration information for the customer's application 305. In some embodiments, the configuration information comprises identifiers for cells of the application 305, dependencies of the application 305, states of the different cells of the application 305, and a failover workflow. In some embodiments, the identifiers comprise identifiers for each of a plurality of cells of the application distributed across a number of zones 120 or regions 112. In some embodiments, the failover workflow comprises actions to take in the event of a failover event for one or more cells of the application based on one or more of the state of each cell and the one or more dependencies for the application 305. In some embodiments, the configuration information is received via the user interface.

At block 504, in response to the receipt of the configuration information, the failover service 302 (for example, via the worker 303) may store the configuration information in the storage 304 and then propagate the configuration information to other failover service partitions 302 (for example, other storages 304) distributed in other zones 120 and regions 112. In some embodiments, the propagation of the configuration information between or with the other storages 304 comprises updating the states for the corresponding cells to the other storages 304 and communicating the failover workflows, application dependencies, and other configuration information to the other storages 304. Such propagation of the configuration information enables the failover service 302 to provide the highly available service described herein. Additionally, sharing the configuration information and updated states between or with the other storage 304 also enables the failover service 302 to provide highly consistent data since the data stores are updated with the same data and information.

At block 506, the failover service 302 (for example, via one of the partitions of the failover service 302) receives an indication of a change in state of one of the cells (for example of the primary cell) of the application 305 or a request to initiate the failover (for example, in response to a failover event). In some embodiments, the indication may be received from the customer directly, for example via the user interface that is in data communication with the failover service 302. In some embodiments, the indication is detected by the failover service 302 or the network-based services 110 automatically based on detecting a failure in a zone 120 or region 112 or similar component. In some embodiments, the change of state or failover request is propagated to other partitions or cells of the failover service 302.

At block 508, the failover service 302 (for example, via the worker 303) accesses the failover workflow (for example, from the storage 304). The failover service 302 identifies actions to take during or following the failover event, as described above. For example, the failover workflow identifies new states for one or more application cells or partitions, dependencies to be updated, and so forth. The failover service 302 may use the actions in the failover workflow to update the state and dependencies to maintain operability of the application 305 and maintain data integrity of the application 305 during and following the failover event. For example, the failover service 302 may update the primary cell to have the fenced state 215 or the standby state 210 and update a secondary cell to have the active state 205.

At block 510, the failover service 302 ensure that the network-based services 110 manages traffic for the application 305 based on the updated states and dependencies. For example, the failover service 302 ensures that the traffic management service and/or the routing service and the DNS service provider routes traffic for the application 305 appropriately to ensure the continued operation of the application while maintaining data integrity of the application 305. Thus, the failover service 302 may ensure that traffic routing is updated between the primary cell and the secondary cell Though not shown in FIG. 5, the failover service 302 may be further configured to identify that the primary cell changes state from the active state to the fenced state and may route at least a portion of read traffic to the primary cell for at least a duration of time after the primary cell changes state to the fenced state. This may allow a secondary cell that replaces the primary cell as having the active state to have some time to complete its state transition and get up to speed before being targeted for application requests. In some embodiments, and described herein, the failover service 302 uses a quorum of storages 304 distributed among the different zones 120 and regions 112 to identify that the primary cell change state from the active state 205, for example to the fenced state 215 or the standby state 210.

Example Failover Service Workflows

The failover service 302 described herein may be implemented differently by different parties in the network-based services 110. For example, the customer developing an application 305 may use the following workflow to integrate the failover service 302 and enable the customer to trigger failover for one or more cells of its application 305.

At (1), the customer may launch the application 305. The customer may model the application 305 or cell of the application 305 that is to be replicated across partitions using the failover service 302 by providing identifiers for the application 305 and the cells of the application 305. In some embodiments, launching the application 305 comprises providing configuration information comprising identifiers for cells of the application 305, dependencies of the application 305, states of the different cells of the application 305, and a failover workflow.

At (2), the failover service 302 may create partitions across which the application 305 is replicated. As described herein, the partitions can be any hosted by any combination of zones 120, regions, 112, or on-premises.

At (3), the customer create nodes within the application 305. In some embodiments, the nodes represent or are isolated worker units within the application 305 that are automatically replicated across the application partitions 305. The customers may also set the state of the nodes to one of the following states, as described herein: Active/Passive/Fenced. In some embodiments, the customer may set the state manually through the interface or through an automated workflow. In some embodiments, each state optionally comprises some metadata that is shared with dependencies of the application 305 as identified by the dependency tree of the application 305.

At (4), the customer uses the failover service 302 to create dependencies for the application 305. The customers may configure the dependencies, such as the routing service and/or the traffic management service, and associate nodes of the application 305 that will interface with these dependencies. In some embodiments, the dependencies will poll the failover service 302 to identify and understand the state of every node of the application 305. Based on the state of every node of the application, the dependencies may return specific metadata, and actions (for example, of a failover workflow) can be triggered, such as changing an amount of request traffic directed to a particular node, based on the state of every node of the application 305.

At (5), the failover service 302 may trigger a generated failover workflow. Triggering the failover workflow may comprise using a rule engine to model a sequence of steps that need to be enforced when a state change of one of the nodes is triggered.

Alternatively, a site reliability engineer may use the following workflow.

At (1), the customer uses the failover service 302 to create a dependency tree of all applications 305. For multi-tier applications, the different applications 305 can be grouped into tiered failover groups. In some embodiments, the failover service 302 and/or the network-based services 110 includes a visual editor that enables the customer to drag and drop the failover groups and to display any dependency conflicts.

At (2), the customer creates the failover workflow, which defines the sequence of activities that need to take place when a failover is triggered.

At (3), the failover service 302 monitors status of all-in failover of the multi-tier application. For all-in failover drills, the multi-tier dependency tree may provide visibility into the state of failover at an individual application level and at a failover group level.

In some embodiments, the customer may use the failover service 302 to manually failover traffic to a secondary cell via the traffic management service. For example, the customer's application includes a first instance running in a first, primary region and a second instance running in a second, secondary region and the customer wants to failover traffic to the secondary region manually.

At (1), the customer create the application that is replicated across two (2) partitions, one hosted in the primary region and the other hosted in the secondary region.

At (2), the customer creates a node within the application and assigns the node a name "Node 1." This node may automatically appear in both partitions.

At (3), the customer sets the state of the node in the primary region as "Active" and sets the state of the node in the secondary region as "Passive." The customer also configures two exclusion rules: Active & Active=False, which prevents both nodes from being in the active state 205 at the same time, and Passive & Passive=False, which prevents both nodes from being in the standby state 210 at the same time.

At (4), the failover service 302 configures metadata for each of the states in the form of key value pairs. For example, for the active and passive states, the metadata can comprise the below key-value pairs:

Active:
{
Node: Node 1
Dependency: Global Accelerator
Global Accelerator am:aws:globalaccelerator::123456
Partition: Primary
Traffic Dial: 100%
}
Passive:
{
Node: Node 1
Dependency: Global Accelerator
Global Accelerator am:aws:globalaccelerator::123456
Partition: Secondary
Traffic Dial: 0%
}

At (5), the customer uses the failover service 302 to create a dependency called "Global Accelerator" and associate both nodes with this dependency. Global Accelerator may poll the dependency (for example, continuously or at intervals) and may be returned the metadata, based on which the Global Accelerator will dynamically configure traffic dials for an active/passive set up.

At (6), to manually failover traffic to the secondary region, the customer updates the Node 1 node in the secondary region to "Active." This will automatically transition the state of the Node 1 node in primary region to "Passive." The metadata will be updated and returned to the traffic management service.

Example Interactions for Enforcement of Read-Only States

As described above, the failover service defines the active state 205, the standby state 210, and the fenced state 215, each of which is associated with different available capabilities. For example, the fenced partition or node may serve or process read requests but may not serve or process write requests. Since the different states indicate different capabilities, it is important that the corresponding states be enforced by the various components of the network-based services 110. For example, enforcement of these states and corresponding available capabilities or restrictions allows the failover service and the network-based services 110 to prevent a "split-brain" scenario, in which multiple partitions or nodes for a single application process write requests regarding stored data or information. Such a scenario may result in overwritten data (for example, where the multiple partitions or nodes are writing to the same data) and compromised data integrity.

In some embodiments, the fenced state 215 may be enforced and/or coordinated by restricting or denying write requests at various levels in the network-based services 110 while allowing read requests. In some embodiments, the standby state 210 may be enforced and/or coordinated by restricting or any all requests. The customers may be responsible for denying requests at an application tier. However, making the customers responsible for denying requests may place a large burden on the customers, asking them to exert a high degree of effort to make, test, and deploy changes (for example, to database access logic) to their applications to properly respect the state changes and corresponding capabilities or restrictions. Alternatively, storage providers may be responsible for denying requests at a storage tier. Thus, the storage providers may be responsible to adopt the states defined by the failover service, and each provider may need to go through a similar level of effort as the customer to enforce the states.

An alternative for enforcing the states defined by the failover service that is relatively invisible to the customers and storage providers is applying, at a communication tier or wire-level, a proxy system or a network device implemented by the failover service or the network-based services 110. For example, the network device may review and validate the database requests and associated options against the current state of a cell (for example, a particular partition or node of an application). The network device may allow the failover service and/or the network-based services 110 to support new data stores and/or new customer applications by way of basic protocol support for the new data store without necessitating customized changes to the data stores or customized protocol support for the data stores. Thus, adoption of the states defined by the failover service and the network-based services 110 may correspond to integration or adoption of the network device. The network device may then be added to existing network-based services 110 infrastructure during deployment and by updating endpoint configurations to route corresponding requests (for example, read/write requests to fenced partitions or nodes) through the network device so that the proxy reviews the requests.

Figure 6:
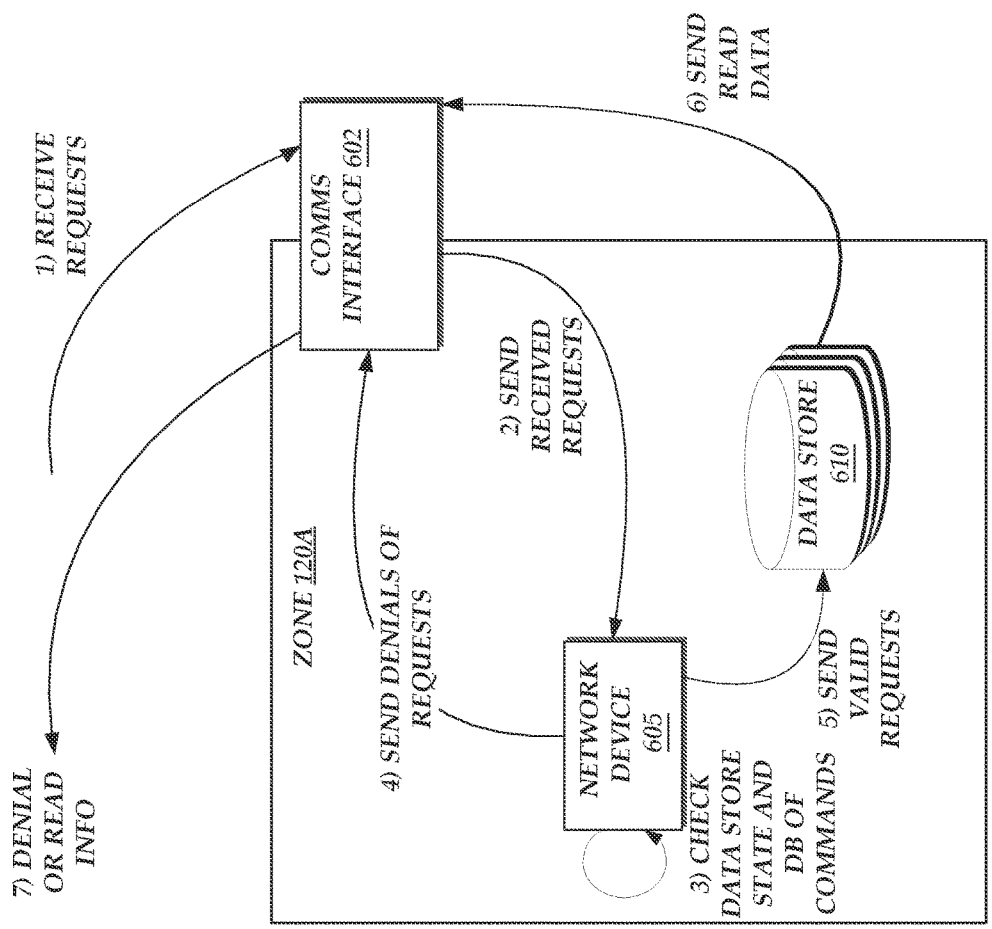
FIG. 6 depicts an example workflow for enforcing a read-only application state as defined by the failover service of FIG. 3 in accordance with aspects of the present disclosure.

With respect to FIG. 6, illustrative interactions are shown for enforcing a read-only application state in accordance with aspects of the present disclosure. As shown in FIG. 6, the zone 120A interfaces with a communications interface 602 and hosts a network device 605 and a data store 610. In some embodiments, the zone 120A may further host a proxy system (not shown in FIG. 6) that performs one or more functions of the network device 605. Though not shown, the data store 610 may be replaced by a cell of the application 305 for the discussion below. In some embodiments, the data store 610 is associated with an application having a partition that is hosted by the zone 120A. In some embodiments, though not shown in FIG. 6, the zone 120A also hosts at least one partition of the application providing the failover services described herein.

The communications interface 602 may be configured to communicate with one or more other zones 120, users, the Internet, and so forth. In some embodiments, the communications interface may receive requests for the application 305 that are directed to the data store 610. At (1), the communications interface 602 receives one or more requests related to one or more of the applications hosted by the zone 120A. The one or more requests received by the communications interface 602 may be directed to the data store 610. The data store 610 may comprise any type of non-transitory data storage component that stores data related to the applications hosted by the zone 120A.

At (2), the communications interface 602 routes all of the received requests to the network device 605. Accordingly, all application requests directed to the data store 610 are routed to the network device 605. In some embodiments, the communications interface 602 does not perform any analysis or processing of the received requests, aside from forwarding them to the network device 605. In some embodiments, the communications interface 602 routes the requests to the network device 605 instead of to the data store 610 to which the requests are directed.

At (3), the network device 605 determines a state of the data store 610, for example the state in which the data store 610 is operating (for example, one of the active state 205, the standby state 210, and the fenced state 215). For example, the network device 605 reviews polls the failover service to determine whether the data store 610 is in one of the active state 205, standby state 210, and the fenced state 215. The network device 605 can communicate the state of the data store 610 to block storage services, customers, etc. In some embodiments, the network device 605 polls the failover service to determine the state of the data store 610 every time it receives a request forwarded from the communications interface 602. In some embodiments, the network device 605 polls the failover service at predetermined or dynamic intervals such that the network device 605 does not need to poll the failover service with every request. For example, the predetermined or dynamic interval may be 0.01 second, 0.1 second, 1 second, 1 minute, and so forth. The network device 605 may continue to poll the failover service to identify when the data store 610 changes state.

At (3), the network device 605 may also identify a database of commands that the data store 610 is permitted or able to process dependent on the state of the data store 610 as well as a database of commands that the data store 610 is not permitted or able to process dependent on the state of the data store 610. In some embodiments, each of the storages 304 of the failover service 302 may comprise these databases of acceptable and unacceptable commands. In some embodiments, the acceptable and unacceptable commands may be stored in a single database.

The network device 605 may poll the failover service 302 for the state information for the data store 610. In some embodiments, the network device 605 specifically polls one or more endpoints 125 of the failover service 302 for the state information. In some embodiments, the state information returned may be based on a quorum of the one or more endpoints 125. In some embodiments, the network device 605 may poll the failover service 302 for the acceptable and/or unacceptable commands for the data store 610 given the state of the data store.

Based on the state of the data store 610, the network device 605 will access the acceptable and unacceptable commands for the state of the data store 610. The network device 605 may parse each request to identify one or more commands in the request. The network device 605 may then identify whether that request is an acceptable request based on comparing the associated one or more commands to the acceptable and unacceptable commands for the data store 610 state. In some embodiments, identifying the one or more commands in the request comprises inspecting individual packets of the request, for example as described below. If the request includes only acceptable commands, then the request will be determined to be a valid request. If the request includes any unacceptable command, then the request will be determined to be an invalid request.

In some embodiments, the active state 205 includes all commands as acceptable commands, the standby state 210 includes no commands as acceptable commands, and the fenced state 215 includes read commands (commands where no data is modified or written) as acceptable commands and write commands (commands where any data is modified or written) as unacceptable commands.

In some embodiments, for each request forwarded by the communications interface 602, the network device 605 may determine whether the request is a read type request (for example, only requesting data in the data store be accessed without modifying any data in the data store) or a write type request (for example, requesting that at least one portion of data in the data store be modified in the data store). In some embodiments, when the network device 605 determines that the request is the read type request, the network device 605 may forward the request to the data store 610 for processing, at (5). In some embodiments, when the network device 605 determines that the request is the read type request, the network device 605 may confirm that the data store 610 is in one of the active state 205 and the failover state 215 or determine the state in which the data store 610 is operating. If the data store is not in the active state 205 or the failover state 215, the network device 605 sends a denial of the request to the communications interface 602, at (4). If the data store is in the active state 205 or the failover state 215, the network device 605 forwards the analyzed request to the data store 610 for processing, at (5). In some embodiments, when the network device 605 sends the denial of the request to the communications interface 602, the network device 605 indicates a reason as to why the request was denied (for example, that the data store 610 is in the wrong state to process the request), for example with an indication of the state of the data store 610, at (4).

In some embodiments, when the network device 605 determines that the request is the write type request, the network device 605 may confirm that the data store 610 is in the active state 205 and not in either of the standby state 210 or the failover state 215. If the data store is not in the active state 205, the network device 605 sends a denial of the request to the communications interface 602 at (4). If the data store is in the active state 205, the network device 605 forwards the analyzed request to the data store 610 for processing, at (5). In some embodiments, when the network device 605 sends the denial of the request to the communications interface 602, the network device 605 indicates a reason as to why the request was denied (for example, that the data store 610 is in the wrong state to process the request).

The data store 610 processes valid requests forwarded by the network device 605. When the data store 610 is in the active state 205 and the received requests comprise read or write requests, the data store 610 processes the received requests and provides any output (for example, data read from the data store 610 pursuant to a read request) to the communications interface 602, at (6). In some embodiments, the data store 610 may send a confirmation of a completed request (for example, a write request) at (6) (though not shown in FIG. 6).

At (7), the communications interface 602 may transmit any denied requests, request confirmations, or read data to a requesting entity. In some embodiments, the denied requests include the reason why the request was denied, as provided by the network device 605. In some embodiments, the request confirmations include a confirmation from the data store 610 that the received request was completed (for example, a completed read confirmation or a completed write confirmation). In some embodiments, the communications interface 602 transmits data to the requesting entity when the received request was a request for data from the data store 610.

In some embodiments, to reduce communication latency and improve analysis times of the database requests being reviewed, the network device 605 and the data store 610 to which the database requests reviewed by the network device 605 are destined share a host (for example, are hosted by the same zone 120A, as in FIG. 6). Alternatively, the network device 605 and the data store 610 may belong to different zones or regions. As distances between the network device 605 and the data store 610 increase, so may the corresponding latency and analysis times for analyzing the requests. In some embodiments, the network device described herein may enforce defined states for various communication mediums, for example middleware, representational state transfer (REST), gRPC, and so forth, or for authentication and/or authorization mechanisms, such as identity and access management (IAM).

In some embodiments, the data store 610 may not have a defined state of its own. Instead, the data store 610 may have a state defined by the state of the zone or region in which the data store 610 is hosted. In some embodiments, the failover service may define states for individual data stores 610, where the data stores 610 are nodes that have defined states. In some embodiments, the network device may be implemented by software components, hardware components, or a combination thereof.

An example of a software implemented network device is provided below. The example code below provides the network device to enforce read-only communication (for example, read requests only) between an arbitrary application and a MySQL database. The network device enforces the read-only communications by inspecting each packet sent or directed to the database. The packets sent to the database can be one of any number of command types supported by the MySQL database. For example, if the network device determines that the packet is a COM_QUERY, the network device inspects the query to determine whether the query contains any standard SQL write operation (for example, INSERT, DROP, CREATE, and so forth). If the query does contain an operation that is blacklisted during the current state (for example, the fenced state), the network device may drop the packet instead of forwarding the packet to the data store. The network device also optionally responds to a source of the packet (for example, an application client) with a MySQL error packet. The network device creates the MySQL error packet to express failure of the packet including the write operation due to the read-only state of the cell. If the network device determines that the packet contains only standard SQL read operations, such as SELECT, the network device may forward the packet to the MySQL database with no intervention.

In the example code below, the network device is a TCP proxy that forwards port 8123 to 3306 (where the SQL database is running). The network device references a function that returns a constant value representing a fenced state for the MySQL database, though this function would be replaced with the action of polling the failover service, as described above.

```
class MySqlPacket(Packet):
name="MySql Packet"
fields_desc=[
Field("payload_length", 0, "<Hx")
Field("sequence_id", " ", "<B"
]
class MySqlResponsePacket(MySqlPacket):
name="MySqlResponsePacket"
fields_desc=[
Field("header", "0", "<B"
]
class MySqlErr(MySqlPacket):
name="ERR Packet"
fields_desc=]
Field("error_code"; "0", "<H")
StrField("error_msg", " ", "<p")
]
class MysqlCommand(MySqlPacket):
name="MySql Command"
fields_desc=[
EnumField("COM", 0, {
0: "COM_SLEEP",
1: "COM_QUIT",
2: "COM_INIT_DB",
3: "COM_QUERY"
}, "<B"),
]
class MySqlQuery(MySqlCommand):
name="COM_QUERY"
fields_desc=[
StrField("query", " ", "<p")
```

Constructing a custom error response, the .show( ) prints the packet to stdout:

```
def_construct_err(pkt: MySqlPacket, msg: str)->bytes:
payload=MySqlErr(error_code=1234, error_msg=msg)
header=MySqlResponsePacket(header=0xff)
response=MySqlPacket(payload_length=len(header+len (payload),
sequence_id=pkt.sequence_id+1)
response.add_payload(header)
response.add_payload(payload)
response.show( )
return bytes(response)
```

The network device performs a mock check for cell state and validates that the query does not include any "write" operation. This is called by validate_request in the proxy (next frame), which deserializes the packet, prints it to stdout for debugging, and checks if the packet is a query:

---

```
WRITE_OPERATIONS = ['insert', 'create', 'drop']
def_handle_query(query: MySqlQuery):
    my_cell_state = get_cell_state('TEST')
    if MeridianCellState.OFFLINE == my_cell_state.
        return True, _construct_err(query, "Cannot write to offline database")
```

-continued

```
elif MeridianCellState.FENCED == my_cell_state and any(op in
str(query.query).lower( ) for op in WRITE_OPERATIONS):
    return True, _construct_err(query, "Cannot write to fenced database")
else:
    print("Allowing:", query.query)
    return False, query
```

Forwarding proxy (Twisted API implementation) that validates the packets:

```
def dataReceived(self, data):
    is_err, err_pkt = validate_request(data)
    if not is_err:
        self.peer.transport.write(data)
    else:
        print("Responding with err", err_pkt)
        self.transport.write(err_pkt)
```

Execute the following statement to create a new table against port 8123 (where the network device is):

mysql -h 127.0.0.1 -P 8123 -u root -p -e "CREATE TABLE IF NOT EXISTS tasks (task_id INT AUTO_INCREMENT, title VARCHAR(255) NOT NULL, start_date DATE, due_date DATE, priority TINYINT NOT NULL DEFAULT 3, description TEXT, PRIMARY KEY (task_id));"

Which results in the following protocol transaction:

Starting with the login handshake—note the password is opaque, also that MariaDb, a MySql derivative, is used, but the protocol is the same.

```
###[ MySql Packet ]###
  payload_length= 110
  sequence_id= 0
###[ MySql Command ]###
  COM = 10
###[ Raw ]###
  load = '5.5.5-10.4.8-MariaDB-
1:10.4.8+maria~bionic\x00H\x00\x00\x00Q\\\\
8B%/Z\x00\xfe\xf7\x08\x02\x00\xff\x81\
x15\x00\x00\x00\x00\x00\x00\x07\x00\x00\
x00Z58[?jx;^G)7\x00mysql_native_password\
x00'
###[ MySql Packet ]###
  payload_length= 182
  sequence_id= 1
###[ Raw ]###
  load =
'\x85\xa2\xbf\x01\x00\x00\x00\x01!\x00\x00\
x00\x00\x00\x00\x00\x00\x00\x00\x00\x00
\x00\x00\x00\x00\x00\x00\x00\x00\x00\
x00root\x00\x14\xe4\x06\xe3K\xc6\x99\x81
\x04zr\xe9\x90\x13IB\x7f\xdb@\
x05Xmysql_native_password\x00e\x03_os\x05Linux\
x0c_client_name\x08libmysql\x04_pid\x043608\
x0f_client_version\x065.7.27\t_platform\
x06x86_64\x0cprogram_name\x05mysql'
###[ MySql Packet ]###
  payload_length= 7
  sequence_id= 2
###[ Raw ]###
  load = '\x00\x00\x00\x02\x00\x00\x00'
```

Note here that the client executes a select statement before the create, the "Allowing: x" is just debug output saying this query can be forwarded

```
###[ MySql Packet ]###
  payload_length= 33
  sequence_id= 0
###[ MySql Command ]###
  COM = COM_QUERY
###[ COM_QUERY ]###
  query = 'select @@version_comment limit 1'
Allowing : b'select @@version_comment limit 1'
###[ MySql Packet ]###
  payload_length= 1
  sequence_id= 1
###[ Raw ]###
  load =
'\x01'\x00\x00\x02\x03def\x00\x00\x00\
x11@@version_comment\x00\x0c!\x00]\
x00\x00\x00\xfd\x00\x00'\x00\x00\x00\
x00\x00\x00\x03\x1fmariadb.org binarydistribution\
x07\x00\x00\x04\xfe\x00\x00\x02\x00\x00\x00'
```

Here, the client finally executes the create statement, since the 'insert', 'create', 'drop' commands are blacklisted, this should fail.

```
###[ MySql Packet ]###
  payload_length= 231
  sequence_id= 0
###[ MySql Command ]###
  COM = COM_QUERY
###[ COM_QUERY ]###
  query = 'CREATE TABLE IF NOT
    EXISTS tasks (task_id INT
    AUTO_INCREMENT, title VARCHAR(255)
    NOT NULL, start_date
    DATE, due_date DATE, priority
    TINYINT NOT NULL DEFAULT 3,
    description TEXT, PRIMARY KEY (task_id)
)'
```

The network device intercepts this and responds with a custom error packet and does not forward the COM_QUERY to the database server:

```
###[ MySql Packet ]####
  payload_length= 34
  sequence_id= 1
###[ MySqlResponsePacket ]###
  header = 255
###[ ERR_Packet ]###
  error_code= 1234
  error_msg = 'Cannot write to fenced database'
Responding with err b'"\x00\x00\x01\xff\xd2\
x04Cannot write to fenced database'
```

The client responds to the proxy saying it would like to quit this interaction due to the error

```
###[MySql Packet]###
  payload_length=1
  sequence_id=0
###[MySql Command]###
  COM=COM_QUIT
```

The MySql command line client then processes the error and prints the following:

ERROR 1234 (HY000) at line 1: Cannot write to fenced database

Example Interactions for Coordinated States Among Multi-Region Architectures

As described above, the application cell that has entered a fenced state should serve read requests, but not write requests. Coordinating transition to and operation in this state is important to prevent split-brain scenarios, as described above. One challenge may be coordinating enforcement of read-only status for application's data stores.

An example of how the customer might apply the fenced state is during the event of a failover from one region or zone to another region or zone. The customer may shift their workload from the zone 120A to the zone 120B due to some degradation in their infrastructure in zone 120A. Although zone 120A is compromised, the customer may set their zone 120A cell to the fenced state 215, allowing the zone 120A cell to continue to serve read requests while operations and/or capacity is scaled up in the zone 120B and traffic shifted from the zone 120A to the zone 120B. Thus, the zone 120A cell is allowed to provide continued, partial responsiveness to read requests for the customer's applications 305. Coordinated fencing (for example, coordinating operations when one application cell is in the fenced state 215) ensures that writes are no longer processed past a coordinated point in time by the zone 120A, allowing for the workload to be processed in the zone 120B without concern for the split-brain scenario.

The failover service 302 allows customers to set the cell state for one or more cells of the application 305 through a 100% available failover service data plane (also referred to herein as "data plane"). In some embodiments, the data plane enforces write consistency through usage of one or more applications for coordinated state. In some embodiments, the applications for coordinated state may be able to operate across multiple regions. In some embodiments, the customers are provided with a number of endpoints (for example, five (5) endpoints) through which the customers can access the data plane with the assurance that at least a subset of the number of endpoints (for example, at least three (3) of the five (5) endpoints) will be available and responsive at any given time, regardless of any regional outages or otherwise. The endpoints generally include the same information, as changes to state information in one endpoint may be propagated to each of the other endpoints. For the customer to transition one of its application cells into the fenced state 215, the customer may make an API, console, or SDK call against any number of the endpoints. The failover service data plane may reconcile these requests via a quorum (for example, ensuring that at least a majority of the endpoints have the same information), propagate the newly decided state to all data plane hosts, and make the newly decided state available for being read by failover service clients with the understanding that customer applications 305 will act upon the fenced state 215. Additional details are provided below.

As described herein, the cells learn of the states they are in by polling the failover service 302 and, thus, know what operations the cell is allowed to perform. Thus, cells in the active state 205 know that they can perform all operations, cells in the standby state 210 know that they cannot perform any operations, and cells in the fenced state 215 know that they can perform some operations (for example, read operations). In some embodiments, if the cell is unable to poll the failover service 302 or does not receive a response to a poll, then the cell may default to the standby state 210 or the fenced state 215. The customers may implement logic to respect and allow/prevent some operations into their applications based on the polled states of the application cells.

The failover service 302 may instruct the routing service and/or the traffic management service to consider an endpoint associated with a host in the active or fenced states as an endpoint healthy to send traffic. On the other hand, if the cell is in the standby state, the failover service 302 may instruct the routing service and/or the traffic management service to consider the corresponding endpoint healthy and prevent any traffic from reaching that endpoint. However, considering delays caused by health checks for the routing service running for each cell and DNS time to live value (TTLs), traffic flow won't be switched instantaneously simply due to the healthiness of the corresponding endpoints. As such, the customer may include in the application 305 logic to interpret cell states to assist in coordinating communications when states change.

Figure 7:
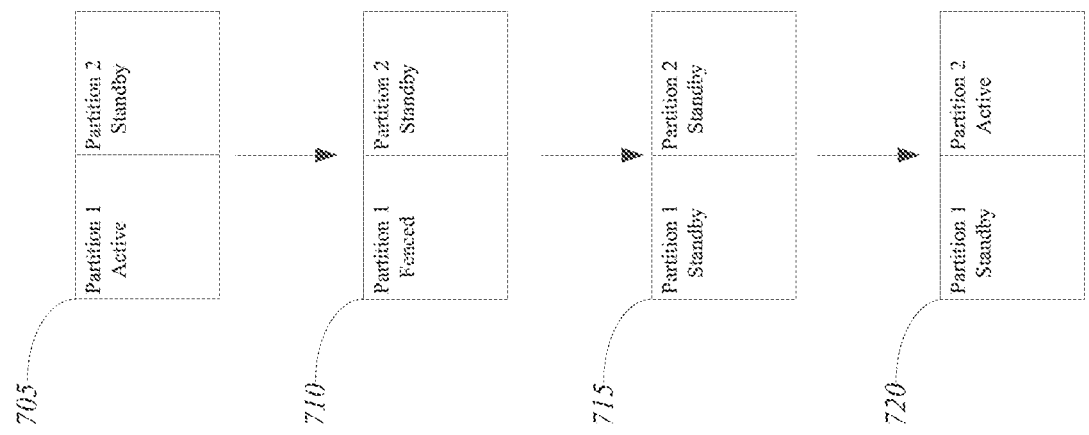
FIG. 7 shows one potential course of state transitions that the customer may implement in their applications.

In some embodiments, the customer may introduce logic into the application 305 that controls, at least in part, state transitions. For example, at a first time point, a first partition of the application 305 may start in the active state 205 and a second partition of the application 305 may start in the standby state 210. The logic in the application 305 may control to or between which states the partitions may transition directly. FIG. 7 shows one potential course of state transitions that the customer may implement in their applications. For example, from the first time point 705, the first partition may transition to the fenced state 215 and the second partition may maintain the standby state 210 at a second time point 710. From the second time point 710, the first partition may transition to the standby state 210 and the second partition may maintain the standby state 210 at a third time point 715. From the third time point 715, the first partition may maintain to the standby state 210 and the second partition may transition to the active state 205 at a fourth time point 720. In some embodiments, the customer may introduce another, optional, state between the third time point 715 and the fourth time point 720, where the first partition maintains the standby state 210 and the second partition transitions to the fenced state 215 before transitioning to the states shown at the fourth time 720.

In some embodiments, the customer may create a failover service stack using a failover service control plane API (or similar service) and will be provided with data plane endpoints to use to check status of the application cells, as described herein. As part of stack creation, the customer may define a minimum state change interval for their application. In some embodiments, the minimum state change interval is a value that controls how quickly application cells can transition from one state to another state (for example, an amount of time that must pass between state changes). Such a value may prevent any application cells from switching states too quickly after another state change, which could result in more than one partition being in the active state 205 at the same time.

The customer may use will have recovery time objective (RTO) and recovery point objective (RPO) targets. After the application cell changes states, the application may be programmed to monitor metrics of the partitions changing state (for example, data replication lag, and so forth) for a period of time to verify that the state change was successful. Once the successful state change is verified, the application 305 may decide whether to transition the application cells to a different state. The customer may determine how quickly application cells will change from a current state to a new state after transitioning to the current state. In some embodiments, if the customer does not wish to include logic in the application 305 to perform such state change validations, the customer can program a lowest allowed minimum state change interval of 2y seconds (where y is a cache duration on the data plane servers). In some embodiments, the lowest allowed minimum state change interval may be customer definable or dynamic.

In some embodiments, each host (for example, node) of a given partition creates an instance of a failover service client. This client may be responsible for interacting with the data plane endpoints to get status and/or properties for a given partition, cell, or host of the application 305. Accordingly, whenever any component running on the host wants to check the state of the component, the component will call the failover service client. The failover service client may check whether there is some state information present in the memory cache of the failover service client. If so, then the failover service client may reply back with that state without making any call to the failover service data plane server. If not, then the failover service client may query the failover service data plane server to learn about the state of the partition. In some embodiments, the response from the failover service data plane server to the query response by the failover service client may contain the queried value (for example, the state) along with an additional field including a lease duration. The lease duration may specify a period of time, time, or date during which the application 305 may cache and use the received state value. Once the period of time lease duration expires (for example, the period of time ends or the time or date passes) the application 305 may discard the state value and request an updated value from the failover service data plane server. In some embodiments, each host of the application 305 polls the failover service 302 for updated state for the host without using a specific failover service client.

In some embodiments, the failover service data plane server that receives the read request from the application 305 may set the lease duration based on when the local cache of the failover service data plane server is set to expire. In some embodiment, an established lease duration may ignore call delays and/or clock skews between devices. If the failover service client is not able to reach a designated endpoint, then the failover service client may poll any of the other data plane endpoints. If the failover service client is not able to reach any of the end points, then the failover service client may provide a default reply to the application 305 of the standby state 210. Alternatively, if the data plane endpoints are unable to generate a quorum for the state information of the requesting application cell, then the failover service client may provide a default reply to the application 305 of the standby state 210. In some embodiments, the lease duration details for the state information may be provided directly to the application 305 without the failover service client interface. Similarly, in some embodiments, the application cell polls the endpoint(s) without use of the failover service client to identify the state of the application cell.

The customer may realize that the application 305 is experiencing a disaster scenario and that the application 305 is in need of performing a failover. In some embodiments, the interface provides visibility metrics for the application 305 and the host for the application 305. In some embodiments, the customer may monitor the metrics (for example, via an operator), along with any other metrics regarding application health, data replication lag, and so forth, to decide whether failover is safe to perform.

The application 305 may call the failover service data plane endpoints to identify any change in the state of a host experiencing the disaster scenario. The failover service data plane may check if there has been any state change made in a previous number of time units (for example, corresponding to the minimum state change interval described above). If so, then the failover service data plane may notify the customer that the state change cannot yet be completed due to the previous state change being within the minimum state change interval. If not, then the failover service data plane may update the state of the partition and confirm the update to the customer.

Whenever an application host may need state information to perform an operation, the application host may check with the failover service client, which will look the state information up in its memory cache or will contact the fail over service data plane server, as described above. As soon as the lease duration expires, the failover service server may notify the failover service client that the state has been transitioned to a new value and the application host may then start operating in its new state. In some embodiments, since the maximum cache duration on the failover server data plan server is y sec, all application hosts may work on a newly set state within 2y seconds.

Figure 8:
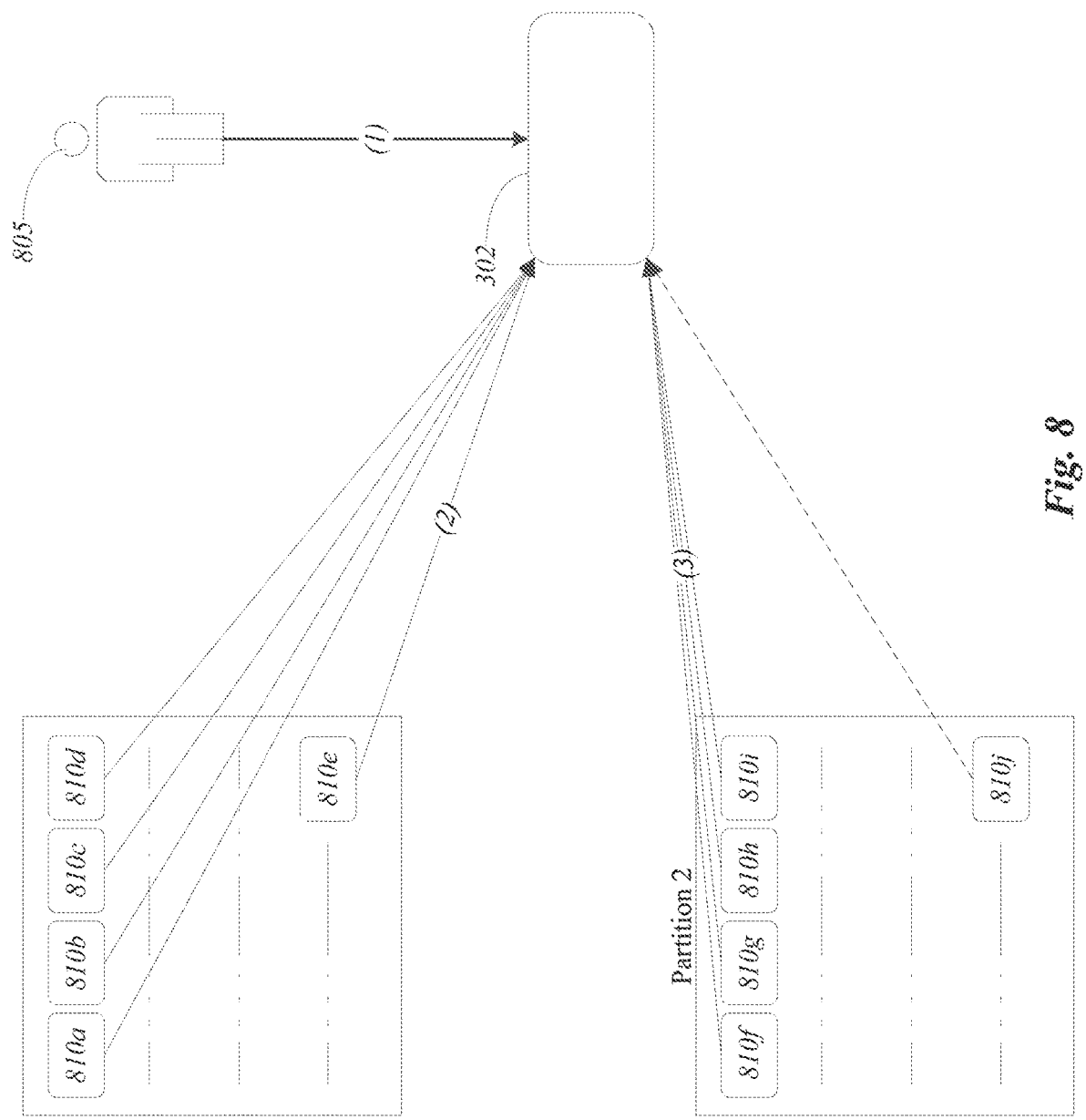
FIG. 8 shows an example workflow of hosts polling the network-based services of FIG. 1.

An example of the host polling for partitions is shown in FIG. 8. FIG. 8 shows, at (1), an operator (for example, the customer) 805 that sends a communication to, for example, a first instance of the network-based services 110. The communication may include a name or identifier of the application 305 for which the operator 805 is providing updated state status, a partition name or identifier for the partition of the application 305 having the state updated, and the new state for the identified partition. As shown in FIG. 8, the new state information is sent to the failover service 302 (for example, a data plane of the failover service 302. In some embodiments, the failover service 302 as shown may represent a computing system for the failover service 302 (for example, a cell for the failover service 302). In some embodiments, the computing system may comprise an endpoint 125 of the failover service 302.

As described herein, the hosts (for example, individual nodes, computing components, and so forth that host an instance of the application 305) 810a-j may poll the failover service 302 to identify the states for the partitions associated with the respective hosts. As such, at (2), each of the hosts of the first partition will send a polling request to the failover service 302 that include the name of the application 305 with which the host is associated and an identifier identifying the first partition as the partition to which the host belongs. Similarly, at (3), each of the hosts of the second partition will send a polling request to the failover service 302 that include the name of the application 305 with which the host is associated and an identifier identifying the second partition as the partition to which the host belongs. In response to the polling, the failover service 302 may communicate a first value indicating of the state of the first host. As such, each host will receive a value corresponding to its state, as determined by the failover service 302 (for example, as stored in the storages 304 of the failover service). In some embodiments, the failover service 302 may control the values communicated to ensure that only one host is given the active state 205. In some embodiments, the failover service 302 may allow multiple hosts to operate in the active state 205. In such embodiments, the customer may need to identify one or more parameters that the failover service 302 uses to route traffic to the appropriate host or to identify which host is the master, etc., for purposes of ensure proper routing of requests and maintaining data integrity. Though not shown in FIG. 8, the failover service 302 may respond to each of the hosts identifying the status of the host's respective partition as stored in the storage 304 of the failover service 302.

As described herein, when the hosts receive their state values from the failover service 302, they may update their states if they need to change to a different state or maintain their states if the received state value is the same as the existing state for the host. In some embodiments, the responses to the polling by hosts may include state change time intervals that control how quickly hosts can change state and/or indications of a sequence of states through which the host transitions to arrive at the state indicated by the received state value. In some embodiments, the host may evaluate the state change time interval along with other metrics for the host before changing states. In some embodiments, the response to the polling includes a lease duration for the state value. The lease duration may indicate to the host how long before the received state value expires, as described above. When the lease duration expires, the host may poll the failover service 302 for its updated state value. In some embodiments, the polling to the failover service 302 by the hosts may be directed to one or more endpoints of the failover service 302.

Validating Proposal

Initially, all hosts (for example, nodes) in the first partition may be in the active state 205 and all hosts in the second partition are in the standby state 210. At a first time t=0, the customer may decide to switch the first partition to the fenced state. By the time t=2y, all noes in the first partition would have received indication of the change of state to and changed state to the fenced state 215. In some embodiments, some of the hosts change state earlier, but regardless all will change state to the fenced state 215 within 2y time units, so by t=2y. At t=x, the customer may be able to change the state of the hosts in the first partition again will be eligible to change state again. Since x>=2y, by t=x, all hosts of the first partition should be in the updated state. Any state change attempted before that time may be rejected by the failover service. At time t=z, the customer may instruct to set the first partition to standby and by time t=z+2y, all hosts in the first partition may change state to the standby state. At the time t=z+2y, the hosts in the first partition may still be receiving some traffic but might not process the traffic if the customer includes logic in the application 305 to not do anything if the host is in the standby state 210. By the time t=z+x, the customer may be eligible to perform a next state change. At the time t=u, the customer may decide to the second partition active and by the time t=u+2y, all hosts in the second partition may be in the active state 205. The hosts in the second partition might not be receiving traffic yet, as the routing service and/or the traffic management service may be delayed in routing traffic (for example, due to health checks and/or DNS TTLs). However, these hosts will be ready for the traffic when it does arrive.

In the scenario described, at no point of time can there be a case when one or more of the hosts in the first partition and one or more hosts of the second partition are both in the active state 205. At any point of time, if any host goes bad (for example, is unable to make calls to the failover service data plan server due to any issue), then the host will consider itself to be in the standby state 210 and, therefore, even if it is receiving traffic, may not process the traffic. For example, if the hosts of the first partition were changed from the active state 205 to the fenced state 215 but one of the first partition hosts was unable to contact the failover service client to identify the new state, the one of the first partition hosts may default to the standby state 210 instead of staying in the active state 205.

Read Call Agreement

In some embodiments, whenever failover service endpoint receives a read call, the failover service endpoint replies back with the response as well as the lease duration for the state information in the response, as discussed above. The customer may reuse/cache the returned state value until the lease duration expires. However, after the lease expires, the customer should make a new call to the failover service to receive an updated state. In some embodiments, the failover service may not provide read after write consistency information. For example, the response provided by the failover service for any read call may or may not contain information regarding the writes made within the past y seconds, where y is the cache time on the failover service data plane server).

Write Call Agreement

In some embodiments, when the failover service endpoint receives a write call, the failover service endpoint will perform one or validation procedures and then only commit a write operation. They customer may receive a confirmation that the write operation was successful. Any traffic flip, if expected after the state change, may be expected to happen eventually after some time based on the DNS TTL expiry. However, the failover service may start communicating new states so that the customer host can act accordingly. In some embodiments, the customer is expected to pass a request timestamp in UTC as part of the request parameters. If the request timestamp is in the future, or it is earlier than the biggest timestamp seen by any failover service endpoint thus far, then the failover service endpoint server might not process the request and may simply reply back with an OutOfOrderRequestException.

If there are multiple simultaneous write calls made to the failover service, then the failover service endpoint server may use the failover service client supplied request timestamp to decide which request is older. If multiple requests have the same timestamp, then among these requests, whichever request reached the failover service endpoint server first will be considered as older request. The commits may be applied from older request to newer request in a sequential fashion.

Write Call Behavior

In some embodiments, an operator will call with failover service data plane to change a state of an application cell. Various options may exist for the write call interactions between the application and the failover service 302.

For example, in a first option, when the customer is calling a control plane or similar API, the customer may use the API to register the failover service 302 to perform a task such as a write operation. The customer can check at any later point in time whether the task failed or succeeded. Similarly, when the customer calls a failover service data plane or similar API, the failover service data plane can reply with an identifier acknowledging that the write operation (for example, the requested state change) was registered successfully in the failover service servers. The failover service data plane may work on performing the registered task and the customer can use the identifier to query a status of the registered task at a later time. In some embodiments, the status may comprise one or more of "in queue," "write successful," "validation error," and so forth. In some embodiments, a successful write call response means that the write operation has been successfully registered for future processing.

In a second operation, the customer can call the failover service data plane API for a write operation. The call may accept the write operation and return a success response. After a period of time, when the failover service 302 attempts to sync changes between endpoints 125, the failover service may detect conflicts between write operations requests and so forth and may attempt to resolve the conflicts. In some embodiments, the customer may not receive any explicit update because the previously committed write call is rejected during conflict resolution. For example, if one endpoint 125 receives a call to set a partition 1 to active and a second 2nd endpoint got call to delete the partition 1, then both customers will receive an initial success response to their respective calls for the write operation, but in the backend, one of the write operations may be silently rejected due to data validations. As such, a successful write call may comprise a write call that the failover service 302 accepted but if needed might be discarded to bring the failover service into a stable state.

In a third option, the customer may call the failover service data plane API for the write operation. The call may only return a success response if the failover service 302 committed the request. As such, the failover service guarantees that after returning 200 OK for the write call, the failover service may not discover any data validation issues or conflicts in the failover service that might force the failover service to silently discard the write operation. Hence, the successful write call may means that the failover service has actually performed the write operation after ensuring there are no validation errors or conflicting writes.

Based on these options, Option 3 may provide the more convenient interaction between the customer and the failover service 302 as opposed to providing tokens for write operation registry. A next preferred alternate may be Option 1, because under Option 1 the customer may be in sync with the failover control plane API. A last option may be Option 2 because the customer may get least amount of visibility regarding which writes are succeeding due to the potential for a confirmed write to be discarded during a conflict resolution.

Figure 9:
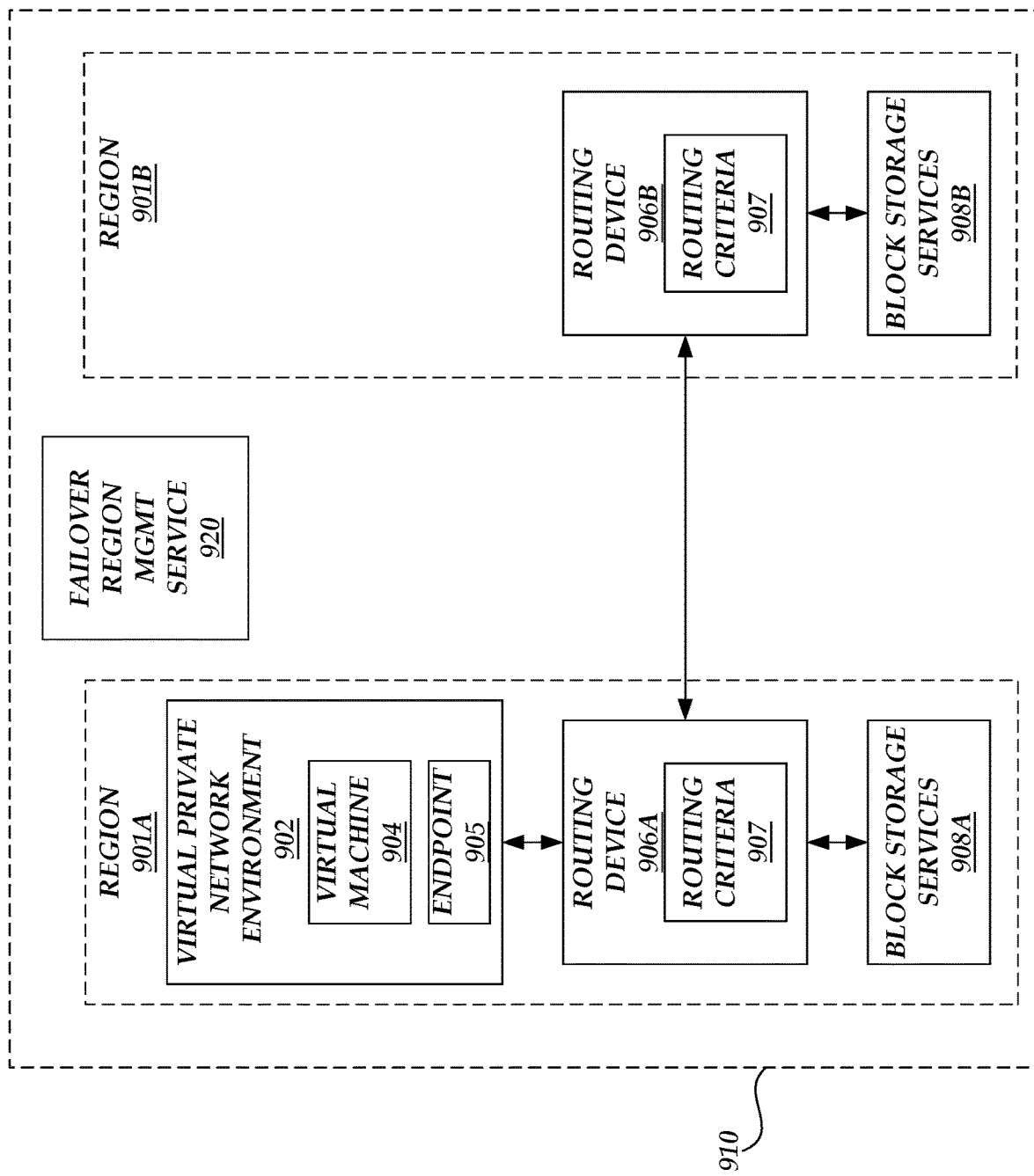
FIG. 9 depicts a schematic diagram of a network service provider in which various embodiments according to the present disclosure can be implemented.

FIG. 9 depicts an example computing environment 900 in which a network service provider 910 provides network-based services to client devices via a network according to some embodiments. The example computing environment 900 includes multiple network devices and block storage services that exist within multiple availability zones or regions. The example computing environment 900 enables failover between regions, such as between region 901A and region 901B. As discussed herein, the propagation of routing criteria, along with the use of network devices to route traffic from endpoints to block storage services, ensures that traffic is routed in a consistent matter in the event that a failure occurs. Further, traffic may be routed consistently based on a routing criteria associated with the source region of the traffic (e.g., the region in which the traffic originated). The network device 906A may receive routing criteria 907 for a virtual machine 904 and route the routing criteria to a network device 906B. By routing the routing criteria to additional network devices, in the event of a failure in region 901A, the network device 906A is able to route the traffic to network device 906B in region 901B and the same routing criteria may be used to route the traffic to block storage services 908A or 908B. As each network device 906A and 906B is routing the traffic based on the same routing criteria, the traffic may be routed in a similar manner by each network device 906A and 906B. Therefore, the example computing environment 900 can route traffic consistently in the event of a failure. Although some examples herein refer to a specific type of device as being the network device 906A or the network device 906B, the examples are illustrative only and are not intended to be limiting, required, or exhaustive. The network device 906A and/or the network device 906B may be any type of network device (e.g., a load balancer, a router, a firewall, etc.). For example, the network device 906A may be an access point. Moreover, the block storage services 908A and/or the block storage services 908B may be any type of computing services.

The network service provider 910 is further shown as divided into a number of regions 901A and 901B (e.g., subnets and/or zones). Each region 901A and 902B may correspond to a network device 906A and 906B and block storage services 908A and 908B. Each region 901A and 902B illustratively represents a computing system that is isolated from the systems of other regions 901A and 902B in a manner that reduces a likelihood that wide-scale events such as a natural or man-made disaster, impact operation of all (or any two) regions 901A and 902B for a network service provider 910. For example, the computing resources of each region 901A and 902B may be physically isolated by being spread throughout the network service provider 910 at distances selected to reduce a likelihood of a wide-scale event affecting performance of all (or any two) regions 901A and 902B. Further, the computing resources of each region 901A and 902B may be associated with independent electric power, and thus be electrically isolated from resources of other region 901A and 902B (though the resources may still communicate with one another via a network, which may involve transmission of electrical signals for communication rather than power), independent cooling systems, independent intra-zone networking resources, etc. In some instances, regions 901A and 902B may be further isolated by limiting operation of computing resources between regions 901A and 902B. For example, virtual machine instances in a region 901A and 902B may be limited to using storage resources, processing resources, and communication links in that region 901A and 902B. Restricting inter-zone cloud or network-based computing operations may limit the "blast radius" of any failure within a single region, decreasing the chances that such a failure inhibits operation of other regions. Illustratively, the block storage services may generally be replicated within regions, such that a client can (if they so choose) utilize the block storage services entirely (or almost entirely) by interaction with a single region.

Each region 901A and 902B may further include a network device (e.g., an instance of the network device) and a partition of the block storage services in order to enable the virtual machine 904 to read from and write to the block storage volumes. Each region 901A and 902B may correspond to a unique instance of the network device and a unique partition of block storage services. For example, region 901A corresponds to network device 906A and block storage services 908A and region 901B corresponds to network device 906B and block storage services 908B. In some embodiments, the network service provider 910 includes more, fewer, or different regions. The block storage services may correspond to a resilient managed service for a client associated with the virtual machine 904. The block storage volumes associated with the block storage services may be scaled according to desired performance (e.g., throughput, number of flows, flows per second, etc.) and can be scaled elastically. For example, the quantity of block storage volumes can be changed as network traffic volume changes and as the network traffic volume increases or decreases, block storage volumes may be added to the quantity of block storage volumes or removed from the quantity of block storage volumes. Network traffic may further be automatically rerouted to a healthy block storage volume in the event that a block storage volume is unhealthy and/or otherwise unavailable. Further, network traffic to a now unavailable block storage volume may gracefully failover into a currently available block storage volume.

The region 901A can include a virtualized private network environment 902 ("VPE"). Generally described, a VPE can represent a virtualized computing network (hosted by a host device or multiple host devices on a physical network) that enables devices connected to (or "inside") the VPE to communicate as if they were connected to one another via a physical local area network ("LAN"). A VPE may in some instances be referred to as a virtual private cloud ("VPC"). A VPC is a custom-defined, virtual network within a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC), and transit paths. A provider of the substrate network may enable users to configure and manage VPEs on the substrate network. In one specific, non-limiting embodiment, the network service provider 910 may comprise a plurality of physical network computing devices. The network service provider 910 may be configured to host a plurality of virtual network computing providers (VPEs/VPCs), each of the plurality of virtual network computing providers logically separated from each other virtual network computing provider of the plurality of virtual network computing providers.

Turning specifically to the roles of different services within the network service provider 910, the virtualized computing environment 902 may provide host devices that provide resizable computing capacity to users for building and hosting their software systems. The host device and associated control plane functionality can provide an elastic compute cloud service of the cloud provider network. Compute services can be referred to as a virtual compute service, or cloud compute service, in various implementations. Users can use the host devices to launch as many VM instances 904 referred to as virtual computing environments, virtual compute instances, virtual machines, or "instances," as they need. In some embodiments, the compute service may enable an end user to directly access a host device as a "bare metal" compute instance, providing access to the device 122 without virtualization.

The VM instance 904 can have various configurations of processing power, memory, storage, and networking capacity depending upon user needs. The host devices can also include computer storage for temporary data used while an instance is running, however this storage may be limited. For example, the storage may be ephemeral, meaning that data stored in the storage is lost as soon as the instance is shut down this data is lost. To provide access to additional services for the VM instance 904, the VM instance 904 can illustratively access an endpoint device 905 that enables access to block storage services 908A via a network device 906A. The endpoint device 905 may enable private connectivity between the VPE 902 and the block storage services 908A to send traffic between the VPE 902 and the block storage services 908A without exposing the traffic to the public internet. By routing traffic through the endpoint device 905, the traffic may not be sent over the public internet and may reduce exposure to brute force and distributed denial-of-service attacks. Further, the endpoint device 905 may further provide routing criteria 907 in order to ensure that the private nature of the traffic is maintained. The routing criteria 907 can identify network traffic from a VM instance 904 to block storage services 908A. Further, the VM instance 904 and the block storage services 908A may be located in a network (e.g., a private network, a same network, etc.). The VM instance 904 may be associated with a first private IP address and the block storage services 908A may be associated with a second private IP address. Further, the first private IP address and the second private IP address may correspond to the same network.

In order to access the block storage services 908A, the VM instance 904 can route traffic through an endpoint 905A. A user of the VM instance 904 may provide routing criteria 907 for the endpoint that identifies block storage services that the endpoint 905A is authorized to communicate with and/or to not communicate with. The routing criteria 907 may further indicate how to route the traffic in order to maintain the private nature of the traffic. As such the routing criteria 907 may indicate permissible destinations for the traffic of the VM instance 904. For example, the routing criteria 907 may include an allow list and/or a deny list of block storage services. Therefore, the endpoint 905A may route traffic based on the routing criteria.

The endpoint 905A can route traffic from the VM instance 904 to a network device 906A. To facilitate global network addresses, the network device 906A and the network device 906B are provided. Each network device may generally include one or more computing devices configured to obtain requests from a virtual machine instance to interact with services provided by endpoint devices, and to route such requests to a particular block storage service. The network devices 906A and 906B may further act as a type of proxy for the endpoint devices, enabling traffic from the endpoints to the block storage services to flow across the network devices 906A and 906B. The network devices 906A and 906B may thereafter select a block storage volume to which to direct the traffic, based on factors such as availability of block storage volumes, load-balancing, and performance criteria. Further, the endpoint 905A can provide the routing criteria 907 to the network device 906A. The network device 906A may route traffic from the endpoint 905A based on the routing criteria to ensure that traffic is accurately routed. Therefore, the endpoint 905A can route traffic to the network device 906A based on the routing criteria 907 and the network device 906A can further route the traffic based on the routing criteria 907.

Based on the routing criteria, the network devices 906A and 906B can route the request to the block storage services. The network devices 906A and 906B can use NAT translation or encapsulation (e.g., virtual private networks) to redirect the request to the block storage services, preventing disclosure of a network address of the endpoint. Where connection-oriented communication sessions are utilized between virtual machine instances and block storage services, the network devices 906A and 906B may operate to conduct an initialization phase of the communication session on behalf of the block storage services, in accordance with the present embodiments.

The block storage services 908A and 908B can provide access to services. For example, the block storage services 908A and 908B can provide access to block storage volumes and can enable the virtual machine 904 to read from and write to the block storage volumes. It will be understood that the block storage services 908A and 908B may include any services. For example, in some implementations, the block storage services 908A and 908B can include domain name services ("DNS") services, object storage services, relational database services, and other service configurations (not illustrated) for supporting on-demand cloud computing platforms. Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces ("GUIs"), command line interfaces ("CLIs"), application programming interfaces ("APIs")) enabling end users, via user computing devices, to access and configure resources provided by the various services. The cloud provider network 910 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

In order to communicate data to the block storage services 908A (in order to read from and write to a block storage volume), the virtual machine 904 may generate network traffic (e.g., a plurality of packets). The network traffic may be generated and/or routed intermittently over a period of time by the virtual machine 904 for transmission to the block storage services 908A. Prior to the block storage services 908A receiving the traffic, the traffic may be routed through an endpoint 905 to a network device 906A. Further, the network device 906A may route received traffic into a partition of the block storage services 908A. In some embodiments, the network device 906A can load balance the traffic among a plurality of block storage volumes associated with the block storage services 908A. Further, the network device 906A can route traffic based on routing criteria 907 (e.g., an endpoint policy and/or a bucket policy). For example, one or more packets of network traffic may be associated with routing criteria 907 that permits the one or more packets of network traffic to be routed to a first block storage volume but prohibits the one or more packets of network traffic from being routed to a second block storage volume. Therefore, the virtual machine 904 can route the traffic through the endpoint 905 and the network device 907 to the block storage services 908A.

To ensure efficient and timely failover of network traffic, a first region may be designated as a primary region and a second region may be designated as a failover region. A user of the network service provider 910 may identify the status of particular regions. For example, the user may designate a particular region as a primary region and a plurality of regions as failover regions. The network service provider 910 can further be associated with a region configuration (e.g., either an active-active configuration or an active-standby configuration). In some embodiments, the region configuration may be designated by the user. In the example of FIG. 9, the region 901A is designated as the primary region and the region 901B is designated as a failover region. The status of the regions 901A and 901B may be managed by the failover region management service 920 as discussed above. Therefore, the network service provider 910 can include a primary region 901A and a failover region 901B.

The user may designate an endpoint 905 for the virtual private network environment 902. The endpoint 905 can be an access point and/or proxy for communications to and/or from the virtual machine 904. In some embodiments, the network service provider 910 may link the endpoint 905 and the virtual machine 904. The user and/or the network service provider 910 can further designate and/or identify routing criteria 907 associated with the endpoint 905. In some embodiments, the routing criteria 907 may be associated with the endpoint 905 based on a prior designation by the user and/or the network service provider 910. Therefore, the virtual machine 904 can be linked to endpoint 905 and corresponding routing criteria 907.

The virtual machine 904 may route traffic to the endpoint 905 and, based on receiving the traffic from the virtual machine 904, the endpoint 905 may route the traffic to the network device 906A. Further, the endpoint 905 may also route associated routing criteria 907 to the network device 906A. In some embodiments, the routing criteria 907 may be received with incoming network traffic by the network device 906A. In other embodiments, the routing criteria 907 may be received by the network device 906A at a first time and may not be subsequently received. The network device 906A may link the routing criteria 907 and information associated with the endpoint 905 (e.g., an endpoint identifier). For example, the traffic may include the endpoint identifier. Based on linking the routing criteria 907 and the endpoint identifier of the endpoint 905, the network device 906A may determine how to route traffic received from the endpoint 905. For example, the network device 906A can receive traffic from the endpoint 905 and based on receiving traffic from the particular endpoint 905 (e.g., based on determining the traffic includes an endpoint identifier associated with the endpoint 905), the network device 906A can identify the routing criteria associated with the endpoint 905. Therefore, the network device 906A can receive the traffic and determine how to route the traffic based on the routing criteria 907.

The network device 906A may route traffic from the endpoint 905 based on the routing criteria 907. The network device 906A can determine permitted block storage volumes of the block storage services 908A to route the traffic. The network device 906A can further load balance the traffic among the permitted block storage volumes. Therefore, the network device 906A can route traffic to the block storage services 908A.

Prior to the occurrence of a failure in region 901A, the network device 906A may route the traffic received from the endpoint 905 to the block storage services 908A. Based on the designation of region 901A as the primary region or the current region, the network device 906A can route traffic from the endpoint 905 to the block storage services 908A. The network device 906A can route the traffic to the block storage services 908A during a first period of time.

The network device 906A can further receive failover region information from the failover region management service 920. The network device 906A may receive the failover region information as a list of selected, available failover regions. Based on receiving the failover region information, the network device 906A can route the routing criteria 907 associated with the endpoint 905 to network devices located in the available failover regions. For example, the network device 906A can route the routing criteria 907 to a network device 906B in region 901B. The network device 906B may subsequently store the routing criteria 907. The network device 906A may route the routing criteria 907 to the network device 906B in order to maintain the private nature of traffic from the endpoint 905. As network device 906A and 906B may route traffic according to the routing criteria 907, the private nature of traffic from the endpoint 905 may be maintained. Further, the routing criteria 907 may ensure that traffic is routed within the same network as when routed in region 901A. The virtual private network environment 902 and the block storage services 908B may be located in the same network (e.g., private network). Further, the block storage services 908B may be associated with a third private IP address that corresponds to the private network. Each of the block storage services 908B, the block storage services 908A, the virtual private network environment 902, the VM instance 904, the endpoint 905, the routing device 906A, and/or the routing device 906B may be located in the same private network. Further, the network device 906A may designate, to the network device 906B, that the routing criteria 907 is associated with the endpoint 905. It will be understood that the network device 906A can provide the routing criteria 907 and associated endpoint information to more, fewer, or different network devices corresponding to more, fewer, or different failover regions. In some embodiments, the network device 906A can provide the routing criteria 907 to each available failover region. Further, the network device 906A can receive routing criteria and associated endpoint information from one or more network devices associated with other regions. For example, the network device 906A may receive routing criteria and associated endpoint information from network device 906B in region 901B. Therefore, each network device can store a plurality of routing criteria and may associate each routing criteria with associated endpoint information.

At a second period of time, a failure may occur in the region 901A. As discussed above, the failover region management service 920 or the region information service (not shown in FIG. 9) can identify that a failure has occurred and/or designate the occurrence of a failure. Information identifying the occurrence of a failure may be provided to the network device 906A. Each network device 906A in the region in which the failure occurred may receive information identifying the occurrence of a failure. For example, the network device 906A may receive information identifying the occurrence of a failure in region 901A. In some embodiments, network devices in different regions may receive information identifying the occurrence of a failure. For example, the network device 906A and the network device 906B may receive information identifying the occurrence of a failure in region 901A. Further, a user of the virtual machine 904 may be notified of the occurrence of the failover event. Therefore, the network device 906A can identify that a failover event has occurred in region 901A.

Subsequent to determining the occurrence of the failover event, the virtual machine 904 may generate traffic and route the traffic through the endpoint 905 to the network device 906A. The network device 906A may determine that the region 901A associated with the virtual private network environment 902 has experienced a failover event. For example, the network device 906A may determine that a failover event associated with the block storage services 908A has occurred (e.g., a particular block storage volume is not available). The network device 906A may receive a designation of the failover event from the failover region management service 920. Based upon receiving traffic from the virtual private network environment 902, the network device 906A can route the traffic to the network device 906B. By routing the traffic to the network device 906B, the network device 906A can ensure that the traffic is routed to the block storage services 908B. In some embodiments, the network device 906A can directly access the block storage services 908B. For example, the network device 906A can route traffic to the block storage services 908B. Therefore, the network device 906A can route traffic to the network device 906B based upon determining that a failover event has occurred.

The network device 906B can receive the traffic from the network device 906A. The network device 906A can determine that the traffic is associated with endpoint 905. Based upon determining that the traffic is associated with endpoint 905, the network device 906B can identify stored routing criteria 907 that is associated with the endpoint 905. By identifying the stored routing criteria 907, the network device 906B can determine how to route the network traffic. Therefore, the network device 906B can identify a particular subset of the blocks storage volumes of the block storage services 908B that satisfy the routing criteria 907. The network device 906B can route the traffic to one or more of the subset of the block storage volumes of the block storage services 908B. In some embodiments, the network device 906B can load balance the traffic between the subset of the block storage services 908B. Therefore, the network device 906B of region 901B can route traffic from an endpoint 905 of region 901A to a block storage volume of the block storage services 908B based on routing criteria associated with the endpoint 905 of region 901A.

Figure 10:
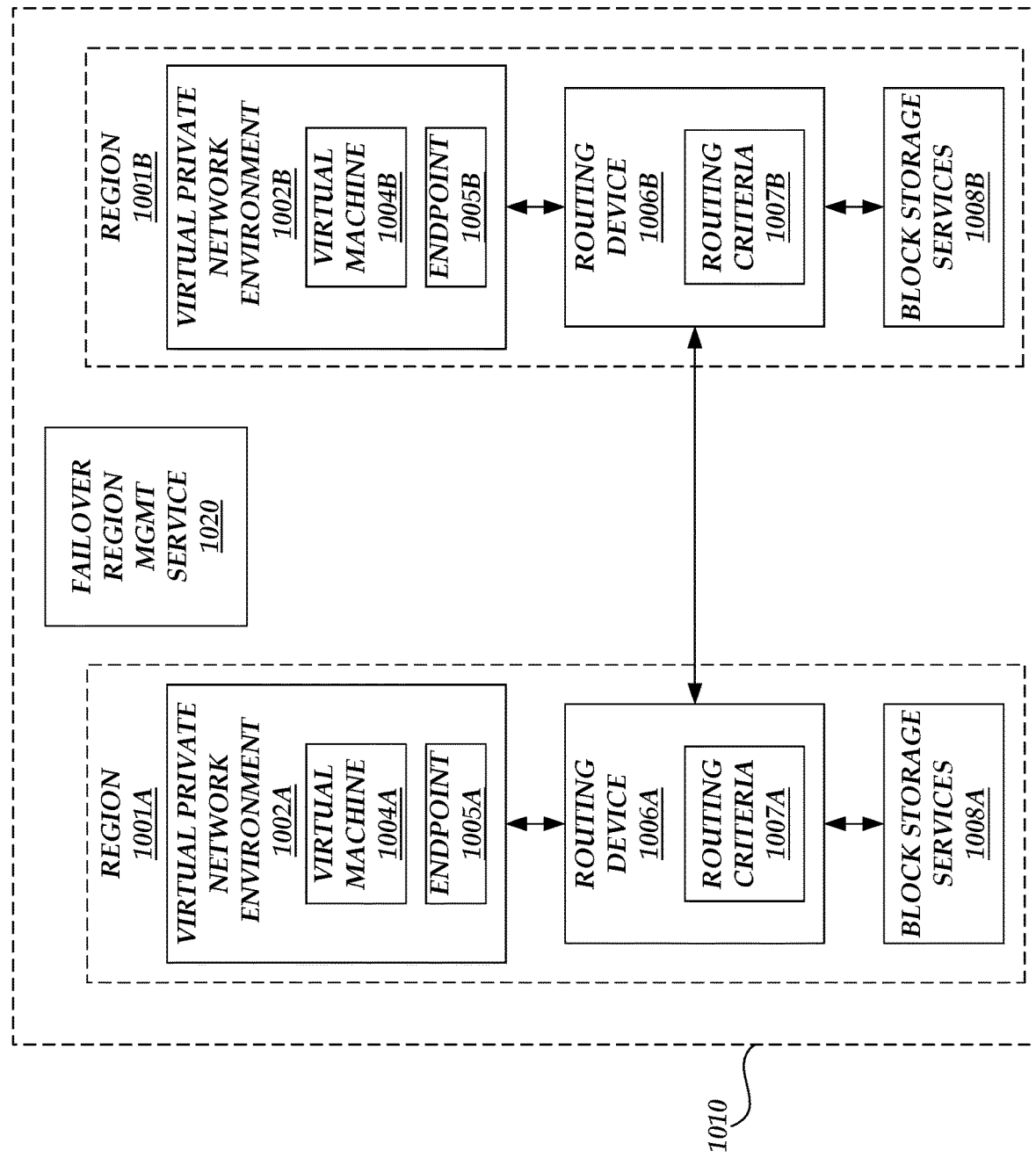
FIG. 10 depicts a schematic diagram of a network service provider in which various embodiments according to the present disclosure can be implemented.

FIG. 10 depicts an example computing environment 1000 in which a network service provider 1010 provides network-based services to client devices via a network according to some embodiments. The example computing environment 1000 includes multiple virtual private network environments, endpoints, routing criteria, network devices, and block storage services that exist within multiple availability zones or regions. The example computing environment 1000 enables failover of traffic between regions, such as between region 1001A and region 1001B. As discussed herein, the failover of traffic between regions and the propagation of endpoint identifiers, ensures that traffic is routed in a consistent matter in the event that a failure occurs. Further, traffic may be routed consistently based on routing criteria associated with the destination region (e.g., the region associated with the destination of the traffic). The network device 1006A may receive routing criteria 1007 from an endpoint 1005A for a virtual machine 1004 and route an endpoint identifier identifying the endpoint 1005A to a network device 1006B. By routing the endpoint identifier to additional network devices, in the event of a failure in region 1001B (or any other region), the network device associated with the affected region is able to modify the traffic to point to the endpoint identifier associated with the new destination region. For example, if the network device associated with the affected region is going to route the traffic to a first region, the network device can modify the traffic to include an endpoint identifier associated with the first region. By modifying the traffic in this manner, the network device can ensure that traffic is routed by routing criteria associated with the destination region (e.g., a primary region or a failover region). Although some examples herein refer to a specific type of device as being the network device 1006A or the network device 1006B, the examples are illustrative only and are not intended to be limiting, required, or exhaustive. The network device 1006A and/or the network device 1006B may be any type of network device (e.g., a load balancer, a router, a firewall, etc.). For example, the network device 1006A may be an access point. Moreover, the block storage services 1008A and/or the block storage services 1008B may be any type of computing services.

To ensure efficient and timely failover of network traffic, a first region may be designated as a primary region and a second region may be designated as a failover region. In the example of FIG. 10, the region 1001A is designated as the primary region and the region 1001B is designated as a failover region for traffic originating in region 1001A.

Further, the region 1001B is designated as the primary region and the region 1001A is designated as the failover region for traffic originating in region 1001B. Therefore, the primary region and failover region for a subset traffic may depend upon the region of origination for the traffic.

The user may designate an endpoint 1005A for the virtual private network environment 1002A and an endpoint 1005B for the virtual private network environment 1002B. The endpoints 1005A and 1005B can be access points and/or proxies for communications to and/or from the virtual machines 1004A and 1004B. In some embodiments, the network service provider 1010 may link the endpoint 1005A and the virtual machine 1004A and the endpoint 1005B and the virtual machine 1004B. The user and/or the network service provider 1010 can further designate and/or identify routing criteria 1007A associated with the endpoint 1005A and routing criteria 1007B associated with the endpoint 1005B.

The virtual machine 1004A may route traffic to the endpoint 1005A and, based on receiving the traffic from the virtual machine 1004A, the endpoint 1005A may route the traffic to the network device 1006A. Similarly, the virtual machine 1004B may route traffic to the endpoint 1005B and, based on receiving the traffic from the virtual machine 1004B, the endpoint 1005B may route the traffic to the network device 1006B. Further, the endpoint 1005A may route associated routing criteria 1007A to the network device 1006A and the endpoint 1005B may route associated routing criteria 1007B to the network device 1006B. The network device 1006A may link the routing criteria 1007A and an identifier of the endpoint 1005A and the network device 1006B may link the routing criteria 1007B and an identifier of the endpoint 1005B. Based on linking respective routing criteria and an identifier of the respective endpoint, the network devices 1006A and 1006B may determine how to route traffic received from the respective endpoints. Therefore, the network devices 1006A and 1006B can receive the traffic and determine how to route the traffic based on the routing criteria 1007A and 1007B.

The network device 1006A may route traffic from the endpoint 1005A based on the routing criteria 1007A. The network device 1006A can determine permitted block storage volumes of the block storage services 1008A to route the traffic. The network device 1006A can further load balance the traffic among the permitted block storage volumes. Therefore, the network device 1006A can route traffic to the block storage services 1008A. Further, the network device 1006B may route traffic from the endpoint 1005B based on the routing criteria 1007B. The network device 1006B can determine permitted block storage volumes of the block storage services 1008B to route the traffic. The network device 1006B can further load balance the traffic among the permitted block storage volumes. Therefore, the network device 1006B can route traffic to the block storage services 1008B.

Prior to the occurrence of a failure in region 1001A and/or a failure in region 1001B, the network device 1006A may route the traffic received from the endpoint 1005A to the block storage services 1008A and the network device 1006B may route the traffic received from the endpoint 1005B to the block storage services 1008B. Based on the designation of region 1001A as the primary region or the current region for traffic received from the virtual private network environment 1002A, the network device 1006A can route traffic from the endpoint 1005A to the block storage services 1008A. Based on the designation of region 1001B as the primary region or the current region for traffic received from the virtual private network environment 1002B, the network device 1006B can route traffic from the endpoint 1005B to the block storage services 1008B. Therefore, the network device 1006A and the network device 1006B can route traffic to the linked block storage services 1008A or 1008B during a first period of time.

The network device 1006A and the network device 1006B can further receive failover region information from the failover region management service 1020. The network device 1006A and the network device 1006B may receive the failover region information as a list of selected, available failover regions. Further, the network device 1006A and the network device 1006B can obtain an identifier of the endpoint for one or more of the failover regions. In some embodiments, the network devices 1006A and 1006B can obtain identifiers of the endpoint for each of the failover regions. For example, the region 1001A can be a failover region for region 1001B and region 1001B can be a failover region for region 1001A. Further, the network device 1006A can receive an endpoint identifier that identifies the endpoint 1005B in region 1001B and the network device 1006B can receive an endpoint identifier that identifies the endpoint 1005A in region 1001A. It will be understood that each network device can obtain more, fewer, or different endpoint identifiers. Each network device 1006A and 1006B may subsequently store the endpoint identifiers. It will be understood that a particular region may provide an endpoint identifier of an endpoint associated with the region to any number of network devices. In some embodiments, the network device 1006A can provide the routing criteria 1007A to each available region for which the region 1001A is designated as a failover region. Therefore, each network device 1006A and 1006B can store a plurality of endpoint identifiers.

At a second period of time, a failure may occur in the region 1001A and/or in region 1001B. For example, a failure may occur in the region 1001A. As discussed above, the failover region management service 1020 or the region information service (not shown in FIG. 10) can identify that a failure has occurred and/or designate the occurrence of a failure. Information identifying the occurrence of a failure may be provided to the network device 1006A. Based on identifying that a failure has occurred, the network device 1006A may determine to route traffic from the virtual machine 1004A in region 1001A to the network device 1006B in region 1001B. In order to route the traffic, prior to routing the traffic, the network device 1006A may update the traffic by linking the traffic to the endpoint identifier of the endpoint 1005B in region 1001B. For example, the network device 1006A can update an endpoint identifier in a PPV2 to the endpoint identifier associated with the endpoint 1005B. Further, the network device 1006A can rewrite the endpoint identifier from an endpoint identifier associated with the endpoint 1005A to an endpoint identifier associated with the endpoint 1005B. Subsequently, the network device 1006A can route the traffic to the network device 1006B. The network device 1006B can receive the traffic and identify an endpoint identifier of the traffic. Further, the network device 1006B can determine that the endpoint identifier of the traffic corresponds to the endpoint identifier associated with the endpoint 1005B. The network device 1006B may further determine routing criteria associated with the endpoint identifier. As the network device 1006B stores routing criteria 1007B associated with the endpoint 1005B, the network device 1006B can retrieve the routing criteria 1007B to route the traffic. As the network device 1006B routes traffic based on routing criteria 1007B associated with the destination of the traffic, the network device 1006B can maintain the private nature of the traffic according to the routing criteria 1007B. Therefore, the network service provider 1010 can ensure that traffic is routed based on routing criteria associated with the region of the destination of the traffic (e.g., the region of the block storage services 1008B that will receive the traffic).

Therefore, the network device 1006B can identify stored routing criteria 1007B that is associated with the endpoint identifier associated with the endpoint 1005B. By identifying the stored routing criteria 1007B, the network device 1006B can determine how to route the network traffic. Therefore, the network device 1006B can identify a particular subset of the blocks storage volumes of the block storage services 1008B that satisfy the routing criteria 1007B. The network device 1006B can route the traffic to one or more of the subset of the block storage volumes of the block storage services 1008B. In some embodiments, the network device 1006B can load balance the traffic between the subset of the block storage services 1008B. Therefore, the network device 1006B of region 1001B can route traffic from an endpoint 1005A of region 1001A to a block storage volume of the block storage services 1008B based on routing criteria 1007B associated with the endpoint 1005B of region 1001B.

In some embodiments, upon receiving traffic from the network device 1006A, the network device 1006B can route the traffic to the virtual private network environment 1002B. For example, the network device 1006B can utilize network address translation to route the traffic to the virtual private network environment 1002B. Further, the network device 1006A may not rewrite the endpoint identifier of the traffic. Instead, the network device 1006B routes the traffic to the virtual private network environment 1002B. Upon receiving the traffic, the virtual private network environment 1002 may route the traffic through the endpoint 1005B to the network device 1006B. As the traffic is routed through the endpoint 1005B, the traffic may be linked to an endpoint identifier associated with the endpoint 1005B. Therefore, the network device 1006B may identify, based on the endpoint identifier, the routing criteria 1007B and route the traffic to the block storage services 1008B.

Figure 11:
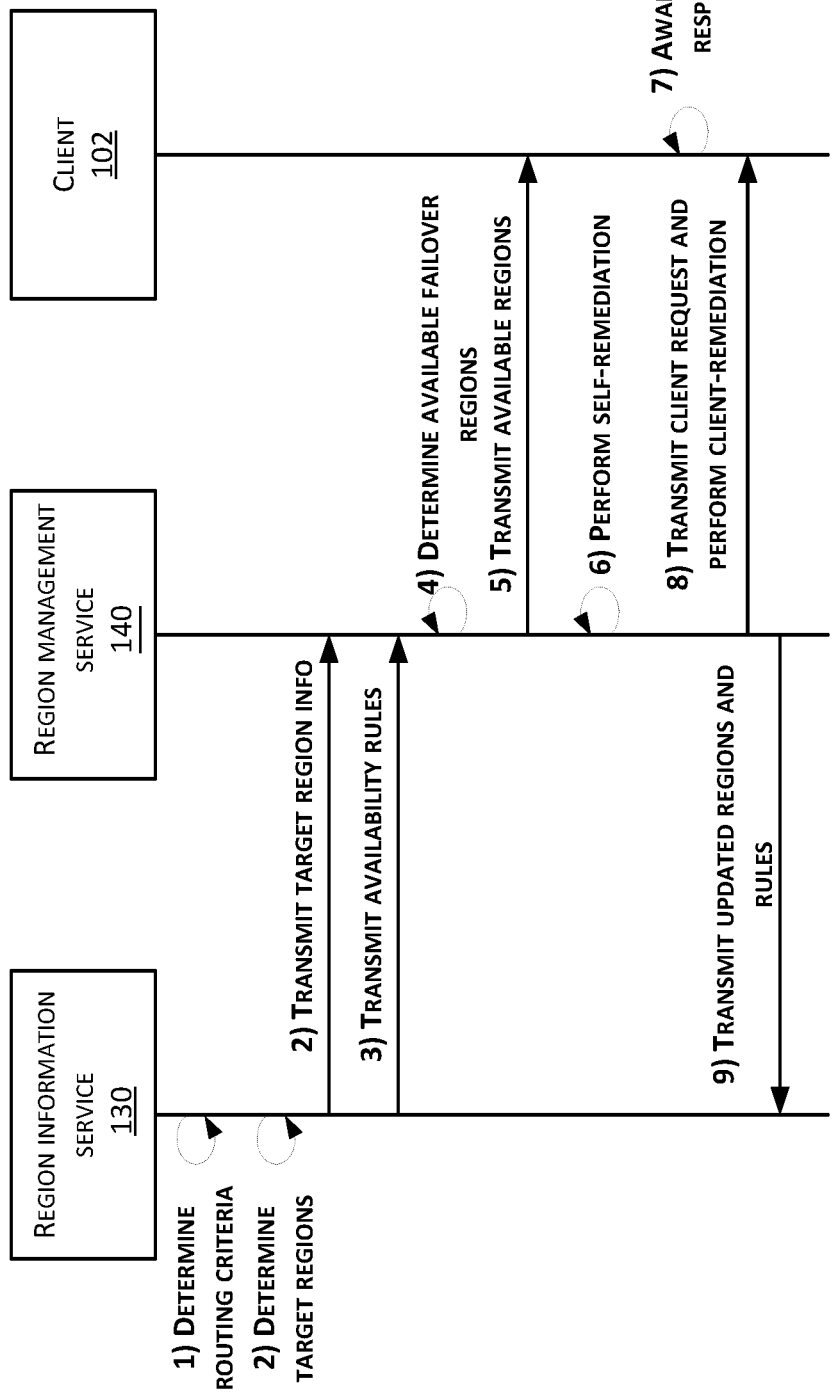
FIG. 11 depicts an example workflow of interactions that implement the failover service of FIG. 9 in accordance with aspects of the present disclosure.

In order to determine which regions are available failover regions, FIG. 11 depicts an example workflow 1100 of interactions the region information processing service 130, the failover region management service 140 and a client device 102 to determine and manage failover region availability in accordance with an illustrative embodiment. As illustrated in FIG. 11, at (1), the region information processing service 130 determines a primary region and a target set of failover regions. The region information processing service 130 may include components for determining a primary region, a list of target failover regions and a list of processing rules. In one embodiment, the region information processing service 130 may generate or obtain the list of regions based on geographic or network proximity, e.g., regions within a defined radius. For example, the region information processing service 130 may be configured to provide the list of regions located within 500 miles of a designated location or set of locations. In some implementations, the region information processing service 130 may be configured to provide the list of regions located within the same country as the user. In some implementations, the region information processing service 130 update the list of rules, the list of failover regions, and the designation of the primary region periodically. For example, the region information processing service 130 may update every hour. In some implementations, the region information processing service 130 may update when instructed to update by a client. In some implementations, the region information processing service 130 may update periodically and update when instructed to update by the client.

In another embodiment, the region information processing service 130 may also determine or identify the primary region or target set of regions based on application of selection criteria related to attributes or characteristics of the regions. For example, the region information processing service 130 may identify or select the region hosting the greatest number of partitions as a primary region. The region information processing service 130 can further identify one or more additional regions as having the minimum number of partitions to function as potential failover regions. Illustratively, the minimum number of partitions for selection as a failover region does not have to correspond to a desired number of partitions as the failover region management service 140 may remediate a target region to increase the number of partitions. In other examples, the region information processing service 130 can also consider network capacity in terms of measured network traffic or executed instructions/processes, measured load or utilization rate availability rates, error rates, attributed financial cost, infrastructure, workload locality, and the like in selecting the target set of failover regions. Illustratively, the client via the client device 102 may select any parameter related to determination of the target set of regions. The network service provider 110 may also specify one or more parameters, such as a minimum list of requirements. For example, the network service provider 110 may specify minimum requirements in terms of capacity and measured load to select primary regions or target failover regions.

At (2), the region information processing service 130 transmits the list of regions to the failover region management service 140. At (3), the region information processing service 130 transmits a set of availability processing rules that allow the failover region management service 140 to determine or characterize availability of the target set of failover regions. As described above, individual processing rule can include an identification of one or more parameters (or combination of parameters) and a corresponding one or more thresholds that characterize the availability of an individual target region. Illustratively, the same parameter and threshold may determine whether region is either available or unavailable (e.g., a region matching or exceeding the threshold). In other embodiments, the processing rule can include a first parameter threshold for determining availability and a second parameter threshold for determining unavailability. In this embodiment, having different parameters can be utilized in conjunction with the region selection criteria previously processed by the region information processing service 130 or the remediation processes implemented by the failover region management service 140. For example, if the region information processing service 130 does not filter out any regions, a second threshold parameter may be set to filter out any regions that have no ability to be remediated by the failover region management service 140.

At (4), the failover region management service 140 determines the number of available failover regions and transmitting these regions to the client device 102 at (5). As described above, the failover region management service 140 can apply the processing rules to the target set of failover regions to identify a set of available failover regions, a set of unavailable regions or combinations/subsets thereof.

At (6), the failover region management service 140 can implement one or more additional process responsive to the determined availability or unavailability of a set of regions. Such responsive processes can include self-remediation in which the failover region management service 140 automatically attempts to configure one or more regions that have been characterized as unavailable in a manner to allow the characterized regions to be subsequently characterized as available. In some embodiments, the self-remediation may include remediating a capacity issue of a failover region. For example, the self-remediation may include increasing the capacity of a region, wherein the capacity is increased such that if an event occurs, the region is primed such that they are available for failover. In some embodiments, the self-remediation may include remediating a configuration of a failover region. For example, the self-remediation may include changing the configuration of one or more regions such that they are available for failover. The automatic or self-remediation may be limited or configured by the failover region management service 140 according to client procedures/limits, such as defining cost limits or the extent of allowable changes. In other embodiments, as described herein, the failover region management service 140 can also conduct readiness checks to verify that target failover regions are currently running and able to function as failover regions.

At (7), the failover region management service 140 may await a client response from the client via the client device 102. The client via the client device 102 may be provided a list of available failover regions and a list of unavailable failover regions. The client 1 via the client device 02 may be provided with an interface of selecting one or more unavailable failover regions to be remediated so that the one or more unavailable failover regions become one or more available failover regions. For example, as further seen in FIG. 3, the client via the client device 102 may be provided with a client interface detailing the available failover regions and the unavailable regions. In other embodiments, the client via the client device 102 may also specify priority information that facilitates a determination of which potential unavailable region to remediate.

Illustratively, at (8), the client via the client device 102 transmits a client response to the failover region management service 140. The failover region management service 140 may be configured to perform the specified remediation corresponding to the client response. The client response may include any set of instructions related to the status of the one or more regions. In some embodiments, the client response may provide one or more regions for remediation, such that the one or more regions satisfy each rule of the list of rules. In some embodiments, the client response may include modifications to the list of rules, wherein the client via the client device 102 provides one or more rules to be included in the list of rules.

At (9), the failover region management service 140 can transmit an updated list of available failover regions or other configuration information to the region information processing service 130. The updated list of failover regions can include updates based on successful remediation or passage/failure of the readiness test. The failover regional management system 140 may be configured to update the list of available failover regions and provide this information to the region information system 130. The failover regional management system 140 may also be configured to update the list of rules based on the client response in (7). The failover regional management 140 may then be configured to provide the updated list of rules to the region information system 130. The region information system 130 may then store the updated list of available regions and the updated list of rules.

Figure 12:
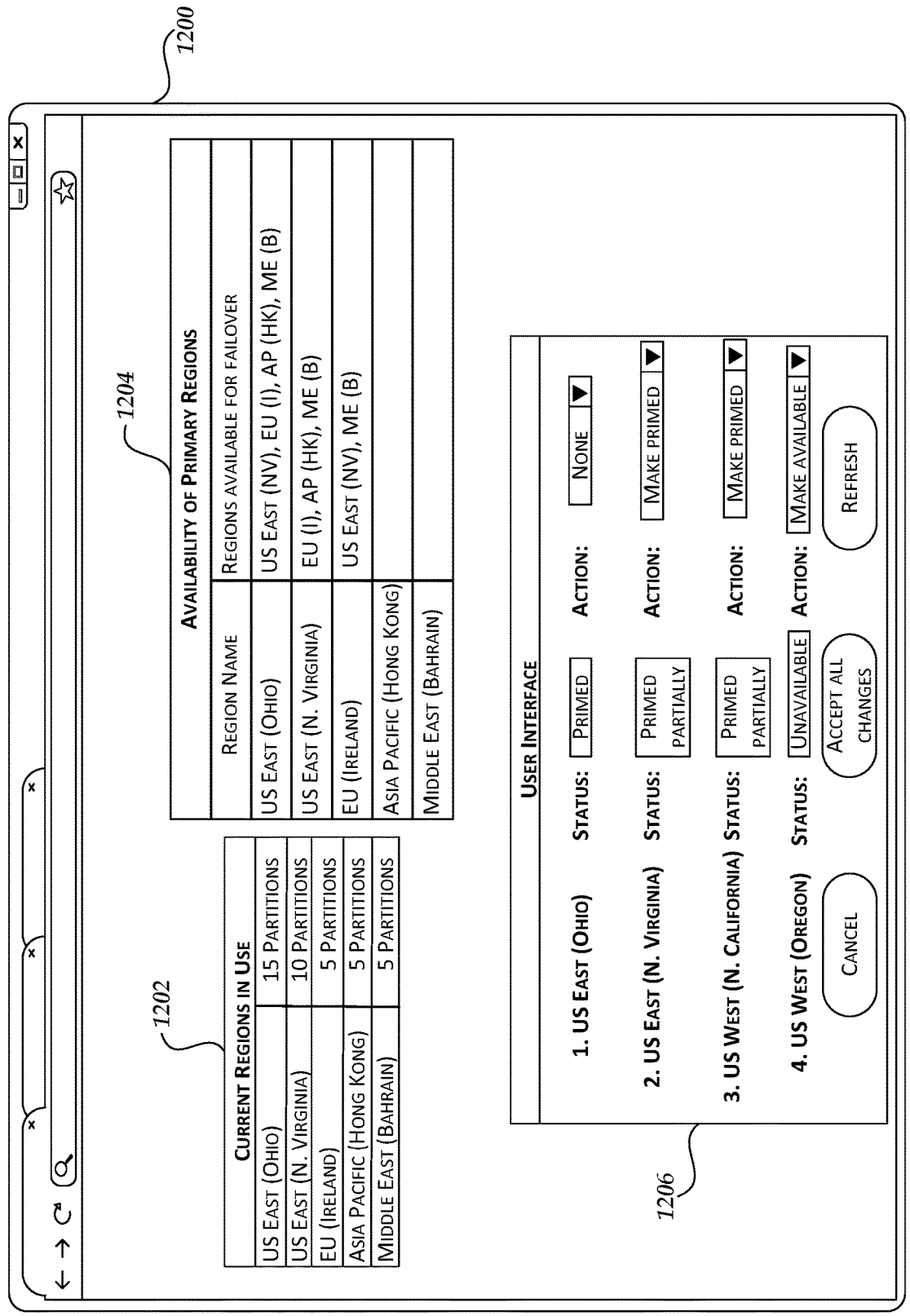
FIG. 12 depicts an example client interface that allows a client to select how the failover service is managed.

FIG. 12 depicts an example client interface 1200 for managing a failover service. The client interface 1200 may enable the customers whose applications are hosted by a network service provider 110 to create dependency trees and failover workflows for their applications. The dependency trees may map and track upstream and downstream dependencies for the customer's applications to determine the steps to take in a failover to ensure data integrity between the application partitions and the continued availability of the application. Furthermore, the failover service may map the upstream and/or downstream dependencies of sub-applications of the customer applications. Based on the mapped partitions and dependencies, the failover service may coordinate partition or node failover in a sequential manner for any of the individual applications. In some embodiments, the dependencies may comprise other applications or services that provide data and requests.

In some embodiments, the interface 1200 is also used to identify failover workflows to be triggered based on the failover states and/or other conditions. The dependency trees and the workflows may be created when the customer designs and creates the application or after the application is created and partitioned. Such dependency trees and failover workflows may enable the failover service to provide visibility into particular dependencies for the application. For example, enabling the customer to see its application's upstream and downstream dependencies, the customer may better understand what sequence of steps or actions are needed during a failover of an application partition or node to ensure availability of the application and data integrity for associated data and can generate the failover workflow accordingly. Thus, the customer may be able to more easily generate a workflow comprising the sequence of steps or actions needed when a failover occurs as opposed to when the dependency tree is not available.

In some embodiments, such failover workflows may be manually triggered by the customer or automatically triggered by the failover service based on the failover states of application partitions or nodes. By tracking the application dependencies and corresponding workflows, the failover service may enable customers to orchestrate failover procedures for applications in a safe, reliable, and predictable manner that maintains data integrity and application availability.

In some embodiments, the customer models their application and/or cells of their application using the failover service. The cells, as used herein, may represent partitions, nodes, or any unit of the application that could be a point of or experience a failure. The customer can use the models of the failover service to define the sequence of steps needed during the failover across one or more applications based on the dependency trees and the like. For example, if the customer detects a failure in the primary partition of the application, the customer can trigger an autoscaling step to scale applications in the secondary partition, after which the customer can trigger a traffic management service to redirect client traffic to the secondary partition. Such controls enable the customer to manage distributed, multi-tier applications in a controlled, reliable, and predictable manner. In some embodiments, the traffic management service may route traffic to an optimal application endpoint based on various parameters relating to performance of the application. In some embodiments, the customer can generate the workflow to include the actions identified above in the event the failure is triggered such that the actions are performed automatically by the failover service.

Similarly, the failover service may provide such controls to the customer to configure workflows (for example, including traffic routing actions using the traffic management service and/or a Domain Name System (DNS) service) implemented based on state changes for application partitions or nodes. In some embodiments, the customer may also configure metadata with state changes for application partitions or nodes. For example, the application partition or node state change may trigger a failover or changing of endpoint or traffic weights per zone or region for the traffic management service and/or the DNS service (also referred to herein as the routing service), which may enable automation of failover workflows and/or sequences of steps.

As described herein, the failover service for the customer application may enable the customer to generate the failover workflow for the application that identifies one or more actions or steps to be taken should the primary partition of the application experience a failure. Thus, as described above, the failover workflow may include steps to take to ensure continued operation of the application and maintained data integrity through individual partition failures. For example, the workflow may include identification of the secondary partition that is a backup to the primary partition (for example, becomes a new primary partition) when a previous primary partition experiences a failure. The failover workflow may also define the state to which the primary partition transitions when it experiences a failure. Though reference herein is made to primary and secondary partitions, the failover services and the failover workflow may apply equally to primary and second nodes.

The client interface 1200 may include a first client interface 1202 for representing the current regions being used by the client's application. The first client interface 1202 may include the names of the regions that are currently being used the client's application. The first client interface 1202 may also include the number of partitions currently being implemented in a certain region. The first client interface 1202 may contain other information related to the one or more regions that are being actively used at one moment in time by the client.

The client interface 1200 may include a second client interface 1204 for representing failover regions that are available to the user. The second client interface 1204 may provide information to the client related to the failover region. For example, the second client interface 1204 may provide the name of the region or the zone, the location of the region or zone, and the endpoint. Further, the second client interface 1204 may be configured to provide information related to the failure rate, downtime, or any other factor of a region that may be used in selecting a region for failover.

The client interface 1200 may include a third client interface 1206 for representing a client input, wherein a client may select one or more options to be performed by the client interface 1200. The third client interface 1206 may first include a designation of the primary region. The third client interface 1206 may select a region to be designated as the primary region based at least in part on a region hosting the largest number of partitions related to this application. In some embodiments, the primary region may be selected on other factors including a designation by the client. For example, the client may be provided with an application to select a region to be selected as the primary region. In some configurations, the client may update the primary region periodically. The third client interface 1206 may include a designation of one or more regions as available failover regions. The available failover regions may correspond to one or more regions that satisfy each rule of the list of rules. The available regions may further correspond to a list of regions that have previously been designated as available. The third client interface 1206 may be configured to periodically update the list of available failover regions and the primary region. For example, the third client interface 1206 may be configured to update the available failover regions and the primary region every hour. Further, the third client interface 1206 may be configured to update the available failover regions and the primary region based upon an input provided by the client. For example, the client may direct the third client interface 1206 to update the available failover regions based upon the client pressing the refresh button located in the third client interface 1206.

The third client interface 1206 may include a designation of one or more regions as unavailable failover regions. The unavailable failover regions or zones may correspond to one or more regions or zones that do not satisfy at least one of the availability rules from the list of rules. The unavailable failover regions may further correspond to a list of regions that have previously been designated as unavailable. The third client interface 1206 may include information detailing why one or more regions are unavailable failover regions. The third client interface 1206 may include a description of the one or more unavailable failover regions. The third client interface 1206 may include a description of the remediation steps that could be taken to remediate one or more unavailable failover regions. The third client interface 1206 may be configured to periodically update the list of unavailable failover regions. For example, the third client interface 1206 may be configured to update the unavailable failover regions every hour. Further, the third client interface 1206 may be configured to update the unavailable failover regions based upon an input provided by the client. For example, the client may direct the third client interface 1206 to update the unavailable failover regions based upon the client pressing the refresh button located in the third client interface 1206.

The third client interface 1206 may include an action list for each region corresponding to the client. Each region corresponding to the client may include one or more regions that are within a radius of the client. Each region corresponding to the client may include one or more regions that the client has preselected for possible failover. The action list may include a list of actions that the third client interface 1206 may cause to be performed on the corresponding region. A possible action may be to a make a region the primary region. The third client interface 1206 may be directed to cause a region to be labeled as the primary region based upon a client input. Further, a possible action may be to make a previously unavailable failover region an available failover region. For example, the third client interface 1206 may detect that a primary region is hosting 15 partitions and a first region can only host 10 partitions. The third client interface 1206 may then determine that the first region is an unavailable failover region because it cannot satisfy the capacity requirements of the primary region. The third client interface 206 may, upon an input by a client, make the first region an available failover region by increasing the capacity of the first region to 15 partitions or above. The third client interface 1206 may include other options for client communication including but not limited to a "cancel" button and an "accept all changes" button.

In some implementations, the client interface 1200 may include one or more other client interfaces for representing more information pertaining to the regions hosting a client's applications. The client interface 1200 may include a fourth client interface that represents the applications that are currently being hosted. The fourth client interface may include information about the number of regions hosting each application. The fourth client interface may include information about the status of each application. The client interface 1200 may include a fifth client interface that represents the one or more clusters that are associated with a client.

Figure 13:
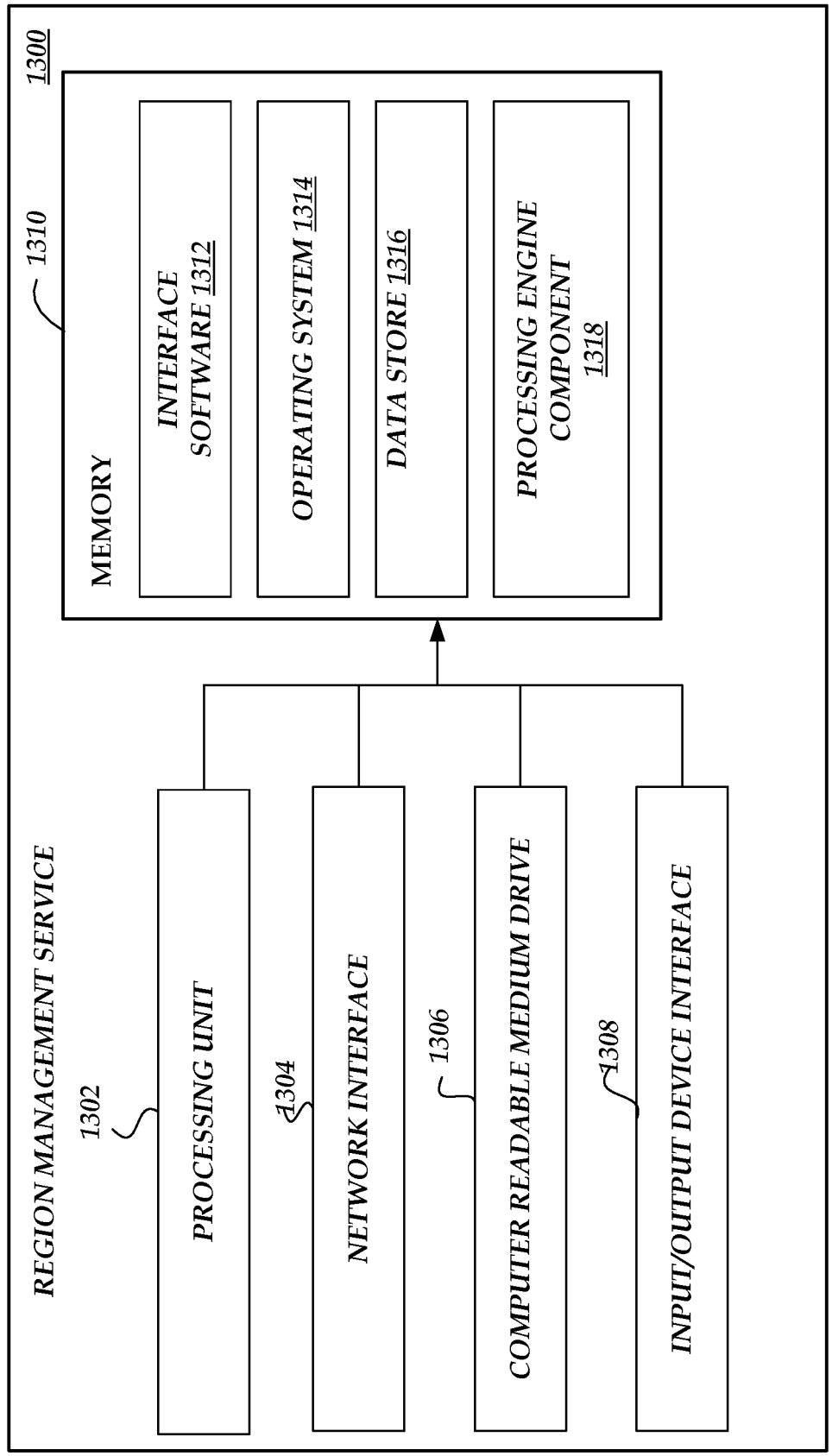
FIG. 13 depicts an example schematic diagram that implements the failover service in accordance with illustrative aspects of the present disclosure.

FIG. 13 depicts a general architecture of a computing device configured to perform the regional information processing service 130, according to some embodiments. The general architecture of the region information processing service 130 depicted in FIG. 13 includes an arrangement of computer hardware and software that may be used to implement aspects of the present disclosure. The hardware may be implemented on physical electronic devices, as discussed in greater detail below. The region information processing service 130 may include many more (or fewer) elements than those shown in FIG. 13. It is not necessary, however, that all of these generally conventional elements be shown in order to provide an enabling disclosure. Additionally, the general architecture illustrated in FIG. 13 may be used to implement one or more of the other components illustrated in FIG. 1.

As illustrated, the region information processing service 130 includes a processing unit 1302, a network interface 1304, a computer readable medium drive 1306, and an input/output device interface 1308, all of which may communicate with one another by way of a communication bus. The network interface 1304 may provide connectivity to one or more networks or computing systems. The processing unit 1302 may thus receive information and instructions from other computing systems or services via the network. The processing unit 1302 may also communicate to and from memory 1310 and further provide output information for an optional display via the input/output device interface 1308. The input/output device interface 1308 may also accept input from an optional input device (not shown).

The memory 1310 can contain computer program instructions (grouped as units in some embodiments) that the processing unit 1302 executes in order to implement one or more aspects of the present disclosure. The memory 1310 corresponds to one or more tiers of memory devices, including (but not limited to) RAM, 4D XPOINT memory, flash memory, magnetic storage, and the like.

The memory 1310 may store an operating system 1314 that provides computer program instructions for use by the processing unit 1302 in the general administration and operation of the failover service. The memory 1310 may further include computer program instructions and other information for implementing aspects of the present disclosure. For example, in one embodiment, the memory 1310 includes a user interface unit 1312 that generates user interfaces (and/or instructions therefor) for display upon a computing device, e.g., via a navigation and/or browsing interface such as a browser or application installed on the computing device. In addition to and/or in combination with the user interface unit 1312, the memory 1310 may further include a data store. The memory 1310 may also include a processing engine component 1318 to manage the implementation of availability rules.

Figure 14:
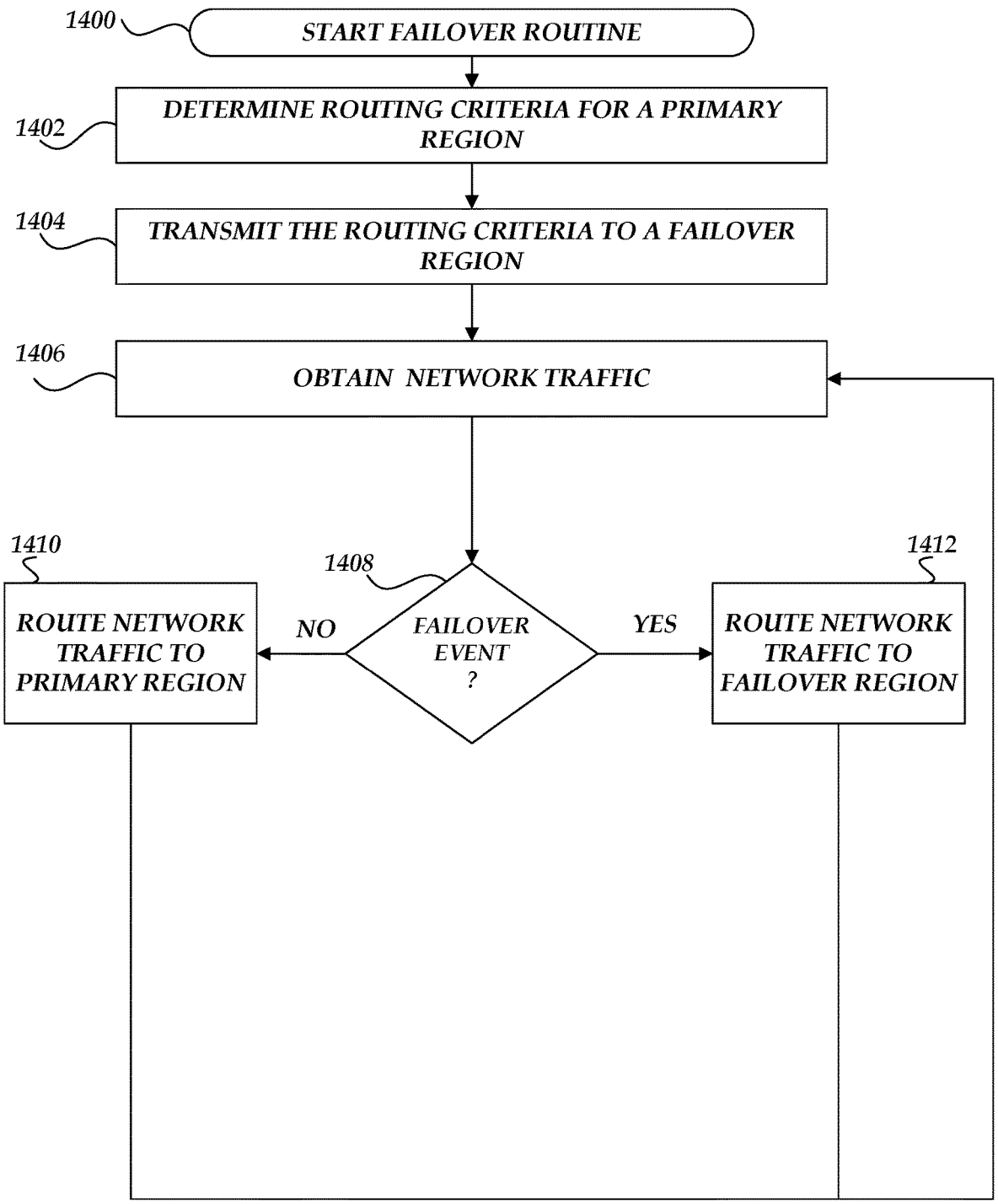
FIG. 14 is a flow diagram illustrative of a failover routine implemented by a failover service in accordance with illustrative aspects of the present disclosure.

FIG. 14 is a flow diagram depicting an example routine 1400 for implementing a failover of traffic. The routine 1400 may be carried out by the network device 906A, for example.

The routine 1400 begins at block 1402, where the network device 906A determines routing criteria for a primary region. In some embodiments, the routing criteria may be a source policy indicating how to route traffic obtained from a data source within the region. For example, the network device 906A can determine an endpoint policy and/or a bucket policy for a primary region. For example, the routing criteria may indicate availability, reachability, performance, latency, or other characteristics associated with the primary region. In some embodiments, the primary region may be associated with a first virtual private network environment (e.g., virtual private network environment 902). The network device 906A may be instantiated within the primary region and may route network traffic based on the routing criteria.

The routine 1400 then continues at block 1404, where the network device 906A transmits the routing criteria to a failover region. In some embodiments, the network device 906A may transmit the routing criteria to more, less, or different failover regions. For example, the network device 906A may transmit the routing criteria to a first failover region and a second failover region. The primary region and the failover region may be in an active-standby region configuration. In some embodiments, the failover region may be associated with a second virtual private network environment. Prior to transmitting the routing criteria to a failover region, the network device 906A can determine a plurality of failover regions. In order to receive the plurality of failover regions, the network device 906A may obtain, via the graphical user interface, a destination of the plurality of failover regions. The plurality of failover regions may be regions that are available to receive network traffic from the primary region. In some embodiments, the primary region may be a first active region and the failover region may be second active region. For example, the first active region and the second active region may be in an active-active region configuration. Further, the primary region and the failover region may each receive a particular portion of network traffic. For example, a first portion of network traffic may be routed to the primary region and a second portion of the network traffic may be routed to the failover region. Further, the first portion of network traffic may be routed from the primary region to the failover region. In transmitting the routing criteria to the failover region, the network device 906A may route the routing criteria to a network device of the failover region (e.g., network device 906B).

The routine 1400 continues at block 1406, where the network device 906A obtains network traffic. The network traffic may be a first packet of network traffic from a data source of the primary region (e.g., a virtual machine). In some embodiments, the network traffic may be network traffic from a virtual machine instance located in the primary region. In other embodiments, the network traffic may be network traffic from a data source located in a second region. Further, the network traffic from the second region may be routed into the primary region to be routed by an endpoint of the primary region. For example, the network device 906A may obtain the network traffic from a virtual machine instance via an endpoint device. Further, the network device 906A may obtain the network traffic from an endpoint associated with a virtual machine.

At decision block 1408 a test is conducted to determine whether a failover event has occurred. If not, at block 1410, the network device 906A can route network traffic to the primary region. The network device 906A can route the packet of network traffic to a first data destination of the primary region based on the routing criteria (e.g., an endpoint policy and/or a bucket policy). If the failover event has occurred, at block 1412, the network device 906A can route network traffic to the failover region. Prior to routing network traffic to the failover region, the network device 906A may determine a particular failover region to route the network traffic. For example, the network device 906A may determine that the routing criteria was transmitted to a first failover region and a second failover region and determine one or more of the first failover region and the second failover region to route the network traffic. Further, the network device 906A may determine one or more of the first failover region and the second failover region based on characteristics (e.g., availability) of one or more of the first failover region and the second failover region. In some embodiments, the network device 906A can determine the occurrence of the failover event associated with the primary region. Further, based on determining the occurrence of the failover event associated with the primary region, the network device 906A can route a second packet of network traffic from the data source of the primary region to the failover region (e.g., to the network device 906B of the failover region). The network device 906B can receive the second packet and route the second packet of network traffic to a second data destination of the failover region based on the routing criteria (e.g., an endpoint policy and/or a bucket policy). In some embodiments, the network device 906A can route a first portion of network traffic to a first failover region and a second portion of network traffic to a second failover region. Further, the first portion of network traffic and the second portion of network traffic may be based on the routing criteria. It will be understood that more, less, or different portions of network traffic may be routed to more, less, or different failover regions. The first data destination and/or the second data destination may be a block storage volume or a collection of block storage volumes (e.g., block storage services). In some embodiments, the network device 906B may not receive the routing criteria and may route the second packet of network traffic based on routing criteria associated with the failover region. Further, the network device 906B may obtain traffic from the failover region and route the traffic based on routing criteria associated with the failover region. The routine 1400 can repeat to block 1406.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a similarity detection system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A similarity detection system can be or include a microprocessor, but in the alternative, the similarity detection system can be or include a controller, microcontroller, or state machine, combinations of the same, or the like configured to estimate and communicate prediction information. A similarity detection system can include electrical circuitry configured to process computer-executable instructions. Although described herein primarily with respect to digital technology, a similarity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a similarity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the similarity detection system such that the similarity detection system can read information from, and write information to, the storage medium. In the alternative, the storage medium can be integral to the similarity detection system. The similarity detection system and the storage medium can reside in an ASIC. The ASIC can reside in a user terminal. In the alternative, the similarity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing failover of traffic, the system comprising:
   a primary region network device configured to:
   determine an endpoint policy for a primary region associated with the primary region network device, wherein the endpoint policy identifies network traffic from a data source to a first data destination, wherein the data source and the first data destination are located in a private network, wherein the primary region network device routes the network traffic based on the endpoint policy;
   determine a plurality of failover regions, wherein the plurality of failover regions correspond to failover regions that are available to receive network traffic;
   transmit the endpoint policy to an alternative network device associated with a failover region of the plurality of failover regions;
   obtain a first packet of network traffic from the data source of the primary region, wherein the primary region network device routes the first packet of network traffic to the first data destination of the primary region based on the endpoint policy, wherein the data source is associated with a first private IP address and the first data destination is associated with a second private IP address, wherein the first private IP address and the second private IP address correspond to the private network;
   determine occurrence of a failover event associated with the primary region; and
   based on determining the occurrence of the failover event associated with the primary region, route a second packet of network traffic from the data source of the primary region to the failover region, wherein the alternative network device of the failover region routes the second packet of network traffic to a second data destination of the failover region based on the endpoint policy, wherein the data source and the second data destination are located in the private network, wherein the second data destination is associated with a third private IP address, wherein the third private IP address corresponds to the private network.

2. The system of claim 1, wherein a graphical user interface is displayed via a user computing device, wherein the primary region network device is further configured to:
   obtain, via the graphical user interface, a designation of the plurality of failover regions.

3. The system of claim 1, wherein the primary region network device is further configured to route the first packet of network traffic to the first data destination of the primary region based on a bucket policy, and wherein the alternative network device of the failover region further routes the second packet of network traffic to the second data destination of the failover region based on the bucket policy.

4. The system of claim 1, wherein the primary region corresponds to a first virtual private network environment and the failover region corresponds to a second virtual private network environment.

5. A first network device for routing network traffic, the first network device configured to:
   obtain a first packet of network traffic from a data source, wherein the first network device routes the first packet of network traffic to a first data destination based on first routing criteria, wherein the first routing criteria identifies the data source and the first data destination, wherein the data source and the first data destination are located in a same network;
   determine occurrence of a failover event; and
   based on determining the occurrence of the failover event, route a second packet of network traffic from the data source to a second network device, wherein the second network device routes the second packet of network traffic to a second data destination based on second routing criteria, wherein the data source and the second data destination are located in the same network, wherein the second network device identifies the second data destination using:
   the first routing criteria based on the second packet of network traffic including an endpoint identifier associated with a first region, wherein the first region is associated with the first network device, wherein the second routing criteria comprises the first routing criteria, or
   the second routing criteria based on the second packet of network traffic including an endpoint identifier associated with a second region, wherein the second region is associated with the second network device.

6. The first network device of claim 5, wherein the second routing criteria comprises the first routing criteria, wherein the data source comprises a first data source, wherein the first network device is further configured to:
   transmit the first routing criteria to the second network device, wherein the second network device routes a third packet of network traffic from a second data source to the second data destination based on third routing criteria, wherein the third routing criteria comprises routing criteria associated with the second region.

7. The first network device of claim 5, wherein the data source comprises a first data source, wherein the second network device:
   routes a third packet of network traffic from a second data source to the second data destination based on the second routing criteria.

8. The first network device of claim 5, wherein at least one of the first routing criteria or the second routing criteria comprise an endpoint policy.

9. The first network device of claim 5, wherein a graphical user interface is displayed via a user computing device, wherein the first network device is further configured to:
obtain, via the graphical user interface, a designation of a plurality of failover regions.

10. The first network device of claim 5, wherein the data source comprises a first data source, wherein the first data source is associated with a first source policy and a second data source is associated with a second source policy, wherein the first network device routes the first packet of network traffic further based on the first source policy, wherein the second network device routes the second packet of network traffic further based on the second source policy.

11. The first network device of claim 5, wherein at least one of the first data destination or the second data destination comprises a block storage volume.

12. The first network device of claim 5, wherein each of the data source, the first network device, the first data destination, and the failover event correspond to a first virtual private network environment and each of the second network device and the second data destination correspond to a second virtual private network environment.

13. The first network device of claim 5, wherein the first region comprises a primary region and the second region comprises a failover region, wherein each of the data source, the first network device, the first data destination, and the failover event are associated with the primary region, wherein each of the second network device and the second data destination are associated with the failover region wherein the primary region and the failover region correspond to an active-standby region configuration.

14. The first network device of claim 5, wherein the first region comprises a first active region and the second region comprises a second active region, wherein each of the data source, the first network device, the first data destination, and the failover event are associated with the first active region, wherein each of the second network device and the second data destination are associated with the second active region, wherein the first active region and the second active region correspond to an active-active region configuration.

15. The first network device of claim 5, wherein each of the first network device, the first data destination, and the failover event are associated with the first region, wherein the data source is located in one or more of:
the first region, wherein the data source comprises a virtual machine instance located in the first region; or
the second region, wherein the data source routes data to the first network device.

16. A computer-implemented method comprising:
obtaining a first packet of network traffic from a data source associated with a primary region, wherein a first network device associated with the primary region routes the first packet of network traffic to a first data destination associated with the primary region based on first routing criteria, wherein the first routing criteria identifies the data source and the first data destination, wherein the data source and the first data destination are located in a network;
determining occurrence of a failover event associated with the primary region; and
based on determining the occurrence of the failover event associated with the primary region, routing a second packet of network traffic from the data source associated with the primary region to a determined failover region, wherein a second network device associated with the failover region routes the second packet of network traffic to a second data destination associated with the failover region based on second routing criteria, wherein the data source and the second data destination are located in the network, wherein the second network device identifies the second data destination using:
the first routing criteria based on the second packet of network traffic including an endpoint identifier associated with the primary region, wherein the second routing criteria comprises the first routing criteria, or
the second routing criteria based on the second packet of network traffic including an endpoint identifier associated with the failover region.

17. The computer-implemented method of claim 16, wherein the second routing criteria comprises the first routing criteria, the computer-implemented method further comprising:
transmitting the first routing criteria to the second network device associated with the failover region, wherein the second network device routes a third packet of network traffic from a second data source associated with the failover region to the second data destination based on third routing criteria, wherein the third routing criteria comprises routing criteria associated with the failover region.

18. The computer-implemented method of claim 16, wherein the second routing criteria comprises routing criteria associated with the failover region, wherein the data source comprises a first data source, wherein the second network device routes a third packet of network traffic from a second data source associated with the failover region to the second data destination based on the second routing criteria.

19. The computer-implemented method of claim 16, wherein at least one of the first routing criteria or the second routing criteria comprise an endpoint policy.

20. The computer-implemented method of claim 16, the computer-implemented method further comprising:
obtaining, via a graphical user interface, a designation of a plurality of failover regions.

21. The computer-implemented method of claim 16, wherein the data source comprises a first data source, wherein the first data source is associated with a first source policy and a second data source is associated with a second source policy, wherein the first network device routes the first packet of network traffic further based on the first source policy, wherein the second network device routes the second packet of network traffic further based on the second source policy.

22. The computer-implemented method of claim 16, wherein obtaining the first packet of network traffic from the data source comprises obtaining the first packet from a virtual machine instance via an endpoint device.

23. The computer-implemented method of claim 16, wherein the primary region corresponds to a first virtual private network environment and the failover region corresponds to a second virtual private network environment.

24. The computer-implemented method of claim 16, wherein the network comprises a private network, wherein the first network device and the second network device are located in the private network.

25. The computer-implemented method of claim 16, wherein the failover region comprises a first failover region, wherein the second routing criteria comprises the first routing criteria, the computer-implemented method further comprising:
- transmitting the first routing criteria to the second network device;
- transmitting the first routing criteria to a third network device associated with a second failover region; and
- determining one or more of the first failover region or the second failover region, wherein the determined failover region corresponds to the first failover region.

26. The computer-implemented method of claim 25, wherein determining the one or more of the first failover region or the second failover region is based on one or more of:
- a user selection;
- a characteristic of the first failover region; or
- a characteristic of the second failover region.

27. The computer-implemented method of claim 16, wherein the failover region comprises a first failover region, the computer-implemented method further comprising:
- based on determining the occurrence of the failover event associated with the primary region, routing a third packet of network traffic from the data source to a second failover region, wherein a third network device associated with the second failover region routes the third packet of network traffic to a third data destination associated with the second failover region based on third routing criteria, wherein the data source and the third data destination are located in the network, wherein a first portion of the network traffic is routed to the first failover region and a second portion of the network traffic is routed to the second failover region.

* * * * *